(12) United States Patent
Hunt

(10) Patent No.: US 11,634,841 B2
(45) Date of Patent: Apr. 25, 2023

(54) LOW PERMEABILITY AND HIGH STRENGTH WOVEN FABRIC AND METHODS OF MAKING THE SAME

(71) Applicant: INV PERFORMANCE MATERIALS, LLC, Wilmington, DE (US)

(72) Inventor: Neil Hunt, Cheltenham (GB)

(73) Assignee: INV Performance Materials, LLC, Wilmington, DE (US)

( * ) Notice: Subject to any disclaimer, the term of this patent is extended or adjusted under 35 U.S.C. 154(b) by 265 days.

(21) Appl. No.: 16/609,756

(22) PCT Filed: Apr. 26, 2018

(86) PCT No.: PCT/US2018/029504
§ 371 (c)(1),
(2) Date: Oct. 31, 2019

(87) PCT Pub. No.: WO2018/204154
PCT Pub. Date: Nov. 8, 2018

(65) Prior Publication Data
US 2020/0063298 A1    Feb. 27, 2020

Related U.S. Application Data

(60) Provisional application No. 62/500,192, filed on May 2, 2017.

(51) Int. Cl.
*D03D 1/02* (2006.01)
*B29C 70/50* (2006.01)
(Continued)

(52) U.S. Cl.
CPC ............ *D03D 1/02* (2013.01); *B29C 65/026* (2013.01); *B29C 70/04* (2013.01); *B29C 70/504* (2013.01);
(Continued)

(58) Field of Classification Search
CPC ..... B29C 65/026; B29C 70/04; B29C 70/504; B29C 70/543; D03D 1/02; D03D 15/00;
(Continued)

(56) References Cited

U.S. PATENT DOCUMENTS

| 2,824,034 A | 2/1958 | Worby |
| 4,442,162 A | 4/1984 | Kuester |

(Continued)

FOREIGN PATENT DOCUMENTS

| CA | 2014249 C | 5/1997 |
| CA | 2429770 A1 | 11/2003 |

(Continued)

OTHER PUBLICATIONS

US 9,085,839 B2, 07/2015, Fink (withdrawn)
(Continued)

*Primary Examiner* — S. Behrooz Ghorishi

(57) ABSTRACT

A method for producing a woven fabric comprises weaving fibers in a warp direction and a weft direction to form a fabric having a top surface and a bottom surface, wherein the warp fibers and weft fibers each comprises one or more filaments of a synthetic polymer having substantially uniform cross-sectional composition. At least a portion of the filaments in the fibers on the top and/or bottom surface of the fabric are then fused together in the presence of a heat transfer liquid or vapor added during the fusing step or added in a prior step of the fabric production process and retained by the filaments. The fusing step produces a treated fabric having a tensile strength in both the warp and weft directions of 1000 N or greater and having, in the absence of any coating, a static air permeability (SAP) of 3 l/dm²/min or lower.

13 Claims, 14 Drawing Sheets

(51) Int. Cl.
  *B29C 70/04* (2006.01)
  *B29C 70/54* (2006.01)
  *B29C 65/02* (2006.01)
  *D06C 15/00* (2006.01)
  *D06C 7/00* (2006.01)
  *B60R 21/235* (2006.01)

(52) U.S. Cl.
  CPC ............ *B29C 70/543* (2013.01); *D06C 15/00* (2013.01); *B60R 2021/23509* (2013.01); *D06C 7/00* (2013.01); *D10B 2401/041* (2013.01); *D10B 2505/124* (2013.01)

(58) Field of Classification Search
  CPC ............ D06C 15/00; D06C 7/00; B60R 2021/23509; B60R 21/235; B60R 21/16; D10B 2401/041; D10B 2505/124
  See application file for complete search history.

(56) References Cited

U.S. PATENT DOCUMENTS

| | | | |
|---|---|---|---|
| 4,921,735 A | 5/1990 | Klaus | |
| 4,977,016 A | 12/1990 | Thornton et al. | |
| 5,073,418 A | 12/1991 | Thornton et al. | |
| 5,076,975 A | 12/1991 | Davis | |
| 5,110,666 A | 5/1992 | Menzel et al. | |
| 5,236,775 A | 8/1993 | Swoboda et al. | |
| 5,370,925 A | 12/1994 | Tomohiro | |
| 5,441,798 A | 8/1995 | Nishimura et al. | |
| 5,540,965 A | 7/1996 | Nishimura et al. | |
| 5,763,330 A | 6/1998 | Bertolucci et al. | |
| 5,782,489 A | 7/1998 | LaLonde | |
| 5,826,905 A | 10/1998 | Tochacek et al. | |
| 5,863,644 A | 1/1999 | Bonigk et al. | |
| 5,879,767 A | 3/1999 | Matsushima et al. | |
| 5,897,929 A | 4/1999 | Li et al. | |
| 5,928,721 A | 7/1999 | Parker et al. | |
| 5,994,243 A | 11/1999 | Bowen et al. | |
| 6,024,380 A | 2/2000 | Kim et al. | |
| 6,291,040 B1 | 9/2001 | Moriwaki et al. | |
| 6,344,251 B1 | 2/2002 | Keshavaraj et al. | |
| 6,399,155 B2 | 6/2002 | Child et al. | |
| 6,458,725 B1 | 10/2002 | Masuda et al. | |
| 6,488,311 B2 | 12/2002 | Kato et al. | |
| 6,520,539 B1 | 2/2003 | Ritter et al. | |
| 6,576,574 B2 | 6/2003 | Child et al. | |
| 6,598,902 B2 | 7/2003 | Keshavaraj | |
| 6,601,614 B1 | 8/2003 | Ishii | |
| 6,607,797 B1 | 8/2003 | Ritter | |
| 6,630,220 B1 | 10/2003 | Veiga | |
| 6,632,754 B1 | 10/2003 | Rose | |
| 6,659,501 B2 | 12/2003 | Rychter | |
| 6,685,220 B2 | 2/2004 | Ohhashi et al. | |
| 6,698,790 B2 | 3/2004 | Iseki et al. | |
| 6,749,220 B1 | 6/2004 | Wipasuramonton et al. | |
| 6,770,578 B2 | 8/2004 | Veiga | |
| 6,886,857 B1 | 5/2005 | Mishina et al. | |
| RE38,769 E | 8/2005 | Keshavaraj et al. | |
| 6,971,674 B2 | 12/2005 | Johansson | |
| 7,468,334 B2 | 12/2008 | Schindzielorz | |
| 7,501,359 B2 | 3/2009 | Li | |
| 7,514,030 B2 | 4/2009 | Nilsson et al. | |
| 7,681,917 B2 | 3/2010 | Guillo et al. | |
| 7,686,331 B2 | 3/2010 | Li et al. | |
| 7,780,194 B2 | 8/2010 | Trondle et al. | |
| 8,007,630 B1 | 8/2011 | Keshavaraj et al. | |
| 8,132,826 B2 | 3/2012 | Schindzielorz | |
| 8,267,423 B2 | 9/2012 | Wipasuramonton et al. | |
| 8,287,685 B2 | 10/2012 | Be et al. | |
| 8,333,220 B2 | 12/2012 | King | |
| 8,361,582 B2 | 1/2013 | Jarvis et al. | |
| 8,376,401 B2 | 2/2013 | Wipasuramonton et al. | |
| 8,408,597 B2 | 4/2013 | Teshima et al. | |
| 8,431,647 B2 | 4/2013 | Dumont et al. | |
| 8,485,550 B2 | 7/2013 | Kino et al. | |
| 8,733,788 B2 | 5/2014 | Finn et al. | |
| 8,778,130 B2 | 7/2014 | Schindzielorz | |
| 8,960,714 B2 | 2/2015 | Kim et al. | |
| 9,067,564 B2 | 6/2015 | Kemp et al. | |
| 9,079,558 B2 | 7/2015 | Crouch | |
| 9,085,834 B2 | 7/2015 | Huber | |
| 9,284,667 B2 | 3/2016 | Pai | |
| 9,469,268 B2 | 10/2016 | Sugimoto | |
| 9,815,430 B2 | 11/2017 | Tanaka | |
| 9,822,471 B2 | 11/2017 | Ise | |
| 9,868,413 B2 | 1/2018 | Ise | |
| 9,896,787 B2 | 2/2018 | Kim et al. | |
| 10,259,421 B2 | 4/2019 | Ise | |
| 2002/0017779 A1 | 2/2002 | Gilpatrick et al. | |
| 2002/0140218 A1 | 10/2002 | Beasley | |
| 2002/0195808 A1 | 12/2002 | Chiou et al. | |
| 2003/0163907 A1 | 9/2003 | Sakurai et al. | |
| 2004/0014386 A1 | 1/2004 | Soelch et al. | |
| 2004/0017070 A1 | 1/2004 | Olson | |
| 2004/0029468 A1 | 2/2004 | Kim et al. | |
| 2004/0171325 A1 | 9/2004 | Woods | |
| 2005/0181168 A1 | 8/2005 | Barnes et al. | |
| 2006/0151882 A1 | 7/2006 | Trondle et al. | |
| 2006/0163853 A1 | 7/2006 | Keshavaraj et al. | |
| 2006/0183390 A1 | 8/2006 | Fukunishi et al. | |
| 2006/0192372 A1 | 8/2006 | Khouri et al. | |
| 2006/0192373 A1 | 8/2006 | Manley | |
| 2006/0237957 A1 | 10/2006 | Woydick | |
| 2006/0252322 A1 | 11/2006 | DeBenedictis et al. | |
| 2007/0007756 A1 | 1/2007 | Okuno et al. | |
| 2007/0031621 A1 | 2/2007 | Morimoto et al. | |
| 2009/0020213 A1 | 1/2009 | Iwata et al. | |
| 2009/0058051 A1 | 3/2009 | Hatfield et al. | |
| 2009/0247030 A1 | 10/2009 | Kano et al. | |
| 2009/0297723 A1 | 12/2009 | Keshavaraj et al. | |
| 2010/0109305 A1 | 5/2010 | Miyata | |
| 2010/0159189 A1 | 6/2010 | Takagi et al. | |
| 2010/0260976 A1 | 10/2010 | Kano et al. | |
| 2011/0076479 A1 | 3/2011 | Danielson et al. | |
| 2011/0316263 A1 | 12/2011 | Lunt et al. | |
| 2012/0026455 A1 | 2/2012 | Takahashi | |
| 2012/0038131 A1 | 2/2012 | Muller et al. | |
| 2012/0205901 A1 | 8/2012 | Westoby | |
| 2013/0026740 A1 | 1/2013 | Finn et al. | |
| 2013/0033027 A1 | 2/2013 | Kim et al. | |
| 2013/0035014 A1 | 2/2013 | Tone et al. | |
| 2013/0189887 A1 | 7/2013 | Akechi et al. | |
| 2013/0295301 A1* | 11/2013 | Schmitt | B60R 21/232 428/12 |
| 2014/0265279 A1 | 9/2014 | Ise et al. | |
| 2014/0272271 A1 | 9/2014 | Tam et al. | |
| 2014/0363636 A1 | 12/2014 | Gubler et al. | |
| 2015/0167207 A1 | 6/2015 | Bongartz et al. | |
| 2015/0246655 A1 | 9/2015 | Furuniwa et al. | |
| 2015/0329998 A1 | 11/2015 | Ise | |
| 2015/0368834 A1 | 12/2015 | Ise | |
| 2016/0130748 A1 | 5/2016 | Veiga | |
| 2017/0067189 A1 | 3/2017 | Yokoi | |
| 2017/0073856 A1 | 3/2017 | Myers et al. | |
| 2017/0080678 A1 | 3/2017 | Bhatnagar et al. | |
| 2018/0014584 A1* | 1/2018 | Kai | A41D 3/04 |
| 2018/0327940 A1 | 11/2018 | Hunt et al. | |

FOREIGN PATENT DOCUMENTS

| | | |
|---|---|---|
| CA | 2507457 C | 8/2009 |
| CN | 1155597 A | 7/1997 |
| CN | 1487890 A | 4/2004 |
| CN | 1771153 A | 5/2006 |
| CN | 101356081 A | 1/2009 |
| CN | 101481850 A | 7/2009 |
| CN | 101033569 B | 12/2010 |
| CN | 102220685 A | 10/2011 |
| CN | 1449338 B | 6/2012 |
| CN | 102859056 A | 1/2013 |
| CN | 103173908 A | 6/2013 |
| CN | 103403240 A | 11/2013 |
| CN | 103649393 A | 3/2014 |

(56) References Cited

FOREIGN PATENT DOCUMENTS

| | | | |
|---|---|---|---|
| CN | 103726168 A | 4/2014 | |
| CN | 104520481 A | 4/2015 | |
| CN | 105189843 A | 12/2015 | |
| CN | 105256597 A | 1/2016 | |
| CN | 105568704 B | 11/2017 | |
| CO | 5840240 A1 | 12/2007 | |
| DE | 2150481 A1 | 4/1973 | |
| DE | 4009611 A * | 10/1991 | ........... B60R 21/235 |
| DE | 4009611 A1 | 10/1991 | |
| DE | 4206997 A1 | 9/1993 | |
| DE | 19852232 A1 | 5/2000 | |
| DE | 10202715 A1 | 12/2002 | |
| DE | 10153243 B4 | 11/2008 | |
| DE | 102008057169 A1 | 5/2010 | |
| DE | 102012019945 A1 | 4/2013 | |
| DE | 102012008481 A1 | 10/2013 | |
| DE | 102017003568 A1 | 1/2018 | |
| EP | 0156102 A2 | 10/1985 | |
| EP | 0768405 A1 | 4/1997 | |
| EP | 0611683 B1 | 8/1997 | |
| EP | 0656842 B1 | 12/1998 | |
| EP | 0896562 A1 | 2/1999 | |
| EP | 0682136 B1 | 7/1999 | |
| EP | 0962363 A1 | 12/1999 | |
| EP | 0963468 A1 | 12/1999 | |
| EP | 0747518 B1 | 5/2002 | |
| EP | 0624210 B1 | 6/2002 | |
| EP | 1255892 B1 | 7/2004 | |
| EP | 0416483 B2 | 9/2004 | |
| EP | 0930988 B1 | 6/2005 | |
| EP | 1475475 B1 | 6/2008 | |
| EP | 2199062 A1 | 6/2010 | |
| EP | 2202120 A1 | 6/2010 | |
| EP | 2221405 A1 | 8/2010 | |
| EP | 2256237 A1 | 12/2010 | |
| EP | 1963564 B1 | 2/2013 | |
| EP | 2586664 A1 | 5/2013 | |
| EP | 1963143 B1 | 11/2013 | |
| EP | 3279377 A1 | 2/2018 | |
| EP | 3323919 A1 | 5/2018 | |
| EP | 2388135 B1 | 7/2019 | |
| FR | 941030 A | 12/1948 | |
| GB | 0226247 | 12/2002 | |
| JP | S6021978 A | 2/1985 | |
| JP | H0516755 A | 1/1993 | |
| JP | H08176932 A | 7/1996 | |
| JP | H09143835 A | 6/1997 | |
| JP | 02-705307 B2 | 1/1998 | |
| JP | H10-076895 A | 3/1998 | |
| JP | 10-102029 A | 4/1998 | |
| JP | 10-266040 A | 10/1998 | |
| JP | H10266040 A | 10/1998 | |
| JP | 02-935939 B2 | 8/1999 | |
| JP | 03-036215 B2 | 4/2000 | |
| JP | 03-147239 B2 | 3/2001 | |
| JP | 2001-507759 A | 6/2001 | |
| JP | 2002-266195 A | 9/2002 | |
| JP | 2002363835 A | 12/2002 | |
| JP | 03-457739 B2 | 10/2003 | |
| JP | 2003-293241 A | 10/2003 | |
| JP | 2004-156166 A | 6/2004 | |
| JP | 2004-176221 A | 6/2004 | |
| JP | H03-536552 B2 | 6/2004 | |
| JP | 2004-339640 A | 12/2004 | |
| JP | 03-720895 B2 | 11/2005 | |
| JP | 2006-027373 A | 2/2006 | |
| JP | 3-873243 B2 | 1/2007 | |
| JP | 3873243 B2 * | 1/2007 | |
| JP | 03-983096 B2 | 9/2007 | |
| JP | 2008507455 A | 3/2008 | |
| JP | 2009-062643 A | 3/2009 | |
| JP | WO2007116676 A1 | 8/2009 | |
| JP | 2009-227017 A | 10/2009 | |
| JP | 2009536125 A | 10/2009 | |
| JP | 2010-018901 A | 1/2010 | |
| JP | 2010-023718 A | 2/2010 | |
| JP | 2010203023 A | 9/2010 | |
| JP | 4603297 B2 | 12/2010 | |
| JP | 2011503374 A | 1/2011 | |
| JP | 4733299 B2 | 7/2011 | |
| JP | 2011-152880 A | 8/2011 | |
| JP | 2011-168131 A | 9/2011 | |
| JP | 2011168919 A | 9/2011 | |
| JP | 04-848658 B2 | 12/2011 | |
| JP | 2013-078977 A | 5/2013 | |
| JP | 05-318659 B2 | 10/2013 | |
| JP | 2015017356 A | 1/2015 | |
| JP | 05-706924 B2 | 4/2015 | |
| JP | 2015-104998 A | 6/2015 | |
| JP | 2017-036530 A | 2/2017 | |
| JP | 2017-065507 A | 4/2017 | |
| JP | 2017-105350 A | 6/2017 | |
| KR | 100504301 B1 | 7/2005 | |
| KR | 20090102707 A | 9/2009 | |
| KR | 10-2011-0001498 A | 1/2011 | |
| KR | 10-2011-0035271 A | 4/2011 | |
| KR | 10-1103802 B1 | 1/2012 | |
| KR | 10-1590152 B1 | 1/2016 | |
| KR | 10-1621078 B1 | 5/2016 | |
| KR | 20160080952 A | 7/2016 | |
| KR | 10-2016-149797 A | 12/2016 | |
| KR | 10-2017-0079655 A | 7/2017 | |
| KR | 10-2018-0036313 A | 4/2018 | |
| KR | 10-2018-0072332 A | 6/2018 | |
| KR | 10-1864888 B1 | 6/2018 | |
| WO | 1998/012075 A1 | 3/1998 | |
| WO | 2003/053678 A1 | 7/2003 | |
| WO | 2012/026455 A1 | 3/2012 | |
| WO | 2014/017967 A1 | 1/2014 | |
| WO | 2014/104240 A1 | 7/2014 | |
| WO | 2015/130882 A1 | 9/2015 | |
| WO | 2015/137495 A1 | 9/2015 | |
| WO | WO-2015130882 A1 * | 9/2015 | ........... B60R 21/235 |
| WO | 2017/079499 A1 | 5/2017 | |
| WO | 2017/169388 A1 | 10/2017 | |
| WO | 2017/176892 A1 | 10/2017 | |
| WO | 2018/204154 A1 | 8/2018 | |
| WO | 2019/067655 A1 | 4/2019 | |
| WO | 2020222111 A1 | 11/2020 | |

OTHER PUBLICATIONS

He "Crystallization of Polypropylene, Nylon-66 andPoly (ethylene Terephthalate) at Pressures to 200 MP a: Kinetics and Characterization of Products", Journal of Polymer Science: Part B: Polymer Physics, vol. 32, 1049-1067 (1994) (Year: 1994).*
International Search Report and Written Opinion for International Applicatio No. PCT/US2018/053009, dated Dec. 3, 2018, 8 pages.
Notice of allowance received for KR application No. 10-2019-7032142, dated Sep. 9, 2020, 4 pages. (1 pages of english translation and 3 pages of official copy).
International Search Report and Written Opinion received for PCT application No. PCT/US2018/029504, dated Jul. 27, 2018, 14 pages.
International Search Report and Written Opinion received for PCT application No. PCT/US18/53009, dated Dec. 3, 2018, 9 pages.
International Search Report and Written Opinion Received for PCT Patent Application No. PCT/US2016/060436, dated Feb. 6, 2017, 11 Pages.
International Preliminary Report on Patentability Received for PCT Patent Application No. PCT/US2016/060436, dated May 17, 2018, 9 Pages.
International Preliminary Report on Patentability Report Received for PCT Patent Application No. PCTUS2015/017646 dated Aug. 30, 2016, 12 pages.
International Search Report and Written Opinion Received for PCT Application No. PCT/US2015/017646, dated May 28, 2015, 14 pages.
Barnes, et al., "Experimental Determination of the Heat Resistive Properties of Airbag Fabrics" Proc. 8th World Textile Congress,

(56) References Cited

OTHER PUBLICATIONS

Industrial, Technical and High Performance Textiles, University of Huddersfield, Jul. 15-16, 1998, pp. 329-338.
First Office Action and Search Report received for CN application No. 202010126427.1, dated Nov. 23, 2020, 15 pages. (8 pages of English translation and 7 pages of Official copy).
Notification of Reasons for Refusal received for JP application No. 2018-543047, dated Oct. 13, 2020, 10 pages. (5 pages of english translation and 5 pages of official copy.
First Examination Report received for IN Application No. 201947044407, dated Jan. 27, 2022, 5 pages.
Office Action received for IN Application No. 202147055317, dated Apr. 1, 2022, 07 Pages.
Office Action received for KR Application No. 10-2020-7009284, dated Apr. 14, 2022, 08 Pages (04 Pages of English Translation and 04 Pages of Official notification).
First Office Action and Search Report received for CN application No. 202011611254.9, dated May 7, 2022, 23 pages. (12 pages of English translation and 11 pages of Official copy).
Notification of Reasons for Refusal received for JP application No. 2020-517914, dated May 24, 2022, 6 pages. (3 pages of english translation and 3 pages of official copy).
Office action received for CO application No. NC2019/0011452, dated May 9, 2022, 16 pages. (6 pages of english translation and 10 pages of official copy).

\* cited by examiner

LOW PERMEABILITY AND HIGH STRENGTH WOVEN FABRIC AND METHODS OF MAKING THE SAME

RELATED APPLICATIONS

This application claims priority to PCT Application No. PCT/US18/29504, filed on Apr. 26, 2018, which further claims priority to U.S. Provisional Application No. 62/500,192, filed on May 2, 2017, which are incorporated herein by reference in their entirety.

FIELD OF THE INVENTION

The invention relates to woven fabric of yarns of synthetic fibers and methods for production and use of such fabric to produce products such as, but not limited to, airbags, sailcloth, inflatable slides, tents, ducts, apparel, filters, coverings and printed media.

BACKGROUND OF THE INVENTION

Fabrics and textiles with high tensile strength have many industrial applications. Many industrial applications require fabrics to meet numerous requirements in order to be useful. These can include tensile strength, air permeability, surface finish, stiffness and packability. Examples of these applications include airbags, sailcloth, inflatable slides, tents, ducts, coverings and printed media.

Inflatable airbags are a key component of vehicle safety systems. As used herein, "airbag" means an inflatable passive safety restraint for automobiles and many other forms of transportation, including military and aviation applications. Airbags are one form of inflatable passive safety restraint device that are now standard in automotive use. In recent years, the number of airbags, and the area of coverage for these airbags within various types of vehicular cabins has increased. Multiple air bag configurations in use include air bags for the front seating area, for side impact protection, for rear seat use, for use in headliner area inflatable curtains, and for use in inflatable seat belts or pedestrian airbags.

Further, as automotive trends move to smaller and lighter vehicles, less space is sometimes available for mandatory safety items such as airbags, while some of the airbags need to be physically larger to meet evolving automotive safety standards. This has led to the problematic situation of some airbag modules needing to be smaller while some airbags need to be larger. Methods have evolved which pack airbags at higher pressures and/or temperatures. While such methods result in an improvement in packability of the airbag within the module, they also tend to be expensive and add complexity to the airbag module manufacturing process.

To meet the requirements for effective inflation, airbag fabric must meet certain tensile strength requirements and have the ability to resist the passage of air, which is defined by measures of air permeability. Therefore, it is desirable for woven nylon or polyester airbags to have a very low porosity and correspondingly low air permeability. While fabric properties, such as the linear density of the yarns, twist factors, weave construction and thickness and weight, all influence air permeability, it has often been necessary to add a coating or additional layer to airbag fabrics to meet industry standards.

Creating an air- and liquid-impervious structure has traditionally been achieved using various forms of coated fabrics produced by processes such as gravure coating, immersion, knife-over-roll coating, curtain coating, knife over air coating, reverse roll, rotary screen, transfer, extrusion, hot melt, lamination, impregnation and metering rod. All of these processes add significant cost to the base fabric.

Polyester and polyamide fabrics having various coatings to reduce permeability are known. U.S. Pat. No. 5,897,929 describes a polyester or polyamide fabric coated with a porosity-blocking layer of polyamide material. U.S. Pat. No. 5,110,666 describes a fabric substrate that is often coated with a polycarbonate-polyether polyurethane which provides certain permeability, flexibility, toughness, and thermal resistance benefits. U.S. Pat. No. 5,076,975 describes a molding operation for forming an elastomer-coated fabric having a defined shape. U.S. Pat. No. 5,763,330 describes a method for extrusion coating a polyethylene resin onto a nylon fabric. The woven fabrics from which airbags are traditionally manufactured may also be coated with elastic materials, notably silicone rubber, to manage the air permeability of the fabric.

However, not only is the coating process slow and laborious, but the coatings themselves are expensive, thus making these airbags very costly. Further, coatings can hinder the foldability of these fabrics, a necessary characteristic for airbags.

As a result, alternatives to coatings for airbag fabrics have been sought. For example, there have been attempts in the past to create low permeability structures that require a reduced amount or no coating that have relied on the shrinkage of the yarn alone, to create a necessarily dense structure. For example, U.S. Pat. Nos. 4,921,735 and 5,540,965 teach shrinking and then heat setting fabrics to improve air impermeability. U.S. Pat. No. RE38,769 E1 also discusses compressing the fabric with the help of an extensible belt and heated roll, but then allowing the fabric to recoil so fabric foldability is improved, while air permeability is not adversely affected.

U.S. Pat. No. 5,073,418, Canadian Pat. No. 2014249C and Chinese Pat. No. CN 101033569B describe calendering an airbag fabric below its softening temperature on both sides to produce a non-permanent, low permeability structure as a result of pressing down the fabric high spots. The permeability drop observed is disclosed as being non-permanent for nylon 6,6 fabrics due to moisture regain.

Published U.S. Patent Application No. 2013/0035014 discloses a fabric that can maintain low air permeability after the fabric is washed. The high-density fabric includes a textured synthetic fiber that has a fineness of 28 dtex or less, and a total cover factor ranging from 1700 to 2200. Disclosed uses for this fabric include a side cloth of a down wear, a down jacket, a futon (i.e., Japanese bedding), and a sleeping bag.

WO 2015/130882 discloses a woven fabric for use in airbags comprising a base yarn and a secondary yarn, wherein the secondary yarn is interwoven into the base yarn, and wherein the secondary yarn has a melting point that is lower than the melting point of base yarn. Also disclosed is a method of making a base yarn and a secondary yarn, wherein the secondary yarn is interwoven into the base yarn, and wherein the secondary yarn has a melting point that is lower than the melting point of the base yarn.

U.S. Pat. No. 8,733,788 B2 discloses a woven fabric which is pretreated with an additive, and is then activated and compressed to form a lower permeability fabric. The compression is disclosed as being specifically to the threadline bundles, with the additive being present to bind the threadlines in their compressed configuration.

WO2017/079499, the entire contents of which are incorporated herein by reference, discloses a fabric, suitable for use in products such as, but not limited to airbags, comprising: yarn formed from synthetic fibers woven in the warp direction and weft direction to form a top surface and a bottom surface; wherein at least a portion of the yarn on the top surface or at least a portion of the yarn on the bottom surface have fibers that are fused together so as to have a permanently modified cross-section; wherein the fabric has a static air permeability (SAP) of 3 l/dm²/min or lower when the fabric is unaged; and wherein the tensile strength of the fabric in both the warp and weft directions is 1000 N or greater when the fabric is unaged.

The present disclosure provides an improved method of producing high strength, foldable fabrics with permanently modified and fused surface filaments, that require a reduced amount of coating or no coating at all, and which still meet critical performance standards, such as permanent low air permeability and high tensile strength, required for uses such as, but not limited to, airbags.

SUMMARY OF THE INVENTION

This disclosure relates to a method to increase the process speed, and hence productivity, of a process to produce uncoated woven fabrics with a permanently low permeability comprising yarns of synthetic fibers, as well as to articles of manufacture comprising such fabrics. In particular, it has been surprisingly found that including a heat transfer liquid or vapor during treatment of the fabric to permanently modify the cross-section and fuse at least a portion of the filaments in the fibers on the top surface or the bottom surface of the fabric results in a faster process of producing uncoated woven fabrics with a permanently low permeability.

Thus, an aspect of the present disclosure relates to a method for producing a woven fabric with a permanently low permeability, the method comprising:

(a) weaving fibers in a warp direction and a weft direction to form a fabric having a top surface and a bottom surface, wherein the warp fibers and weft fibers each comprises one or more filaments of a synthetic polymer having substantially uniform cross-sectional composition;

(b) fusing together at least a portion of the filaments in the fibers on the top surface of the fabric or at least a portion of the filaments in the fibers on the bottom surface of the fabric, wherein said filaments are fused together in the presence of a heat transfer liquid or vapor added during the fusing step or added in a prior step of the fabric production process and retained by the filaments, and wherein the fusing step produces a treated fabric having a tensile strength in both the warp and weft directions of 1000 N or greater and having, in the absence of any coating, a static air permeability (SAP) of 3 l/dm²/min or lower.

Another aspect of the present disclosure relates to a method for producing a woven fabric with a permanently low permeability, the method comprising:

(a) weaving fibers in a warp direction and a weft direction to form a fabric having a top surface and a bottom surface, wherein the warp fibers and weft fibers each comprises one or more filaments of a synthetic polymer having substantially uniform cross-sectional composition;

(b) calendering the fabric in the presence of heat and a heat transfer liquid or vapor added during the calendering step or added in a prior step of the fabric production process and retained by the fabric, wherein the calendering step permanently modifies the cross-section of at least a portion of the filaments in the fibers on the top surface of the fabric or at least a portion of the filaments in the fibers on the bottom surface of the fabric to produce a treated fabric having a tensile strength in both the warp and weft directions of 1000 N or greater and having, in the absence of any coating, a static air permeability (SAP) of 3 l/dm²/min or lower.

In one non-limiting embodiment, the presence of the heat transfer liquid or vapor results from the carry-over of residual moisture introduced by weaving with a water jet loom, washing, or dyeing.

In one non-limiting embodiment, fusing is performed by treating the woven fibers at a temperature and/or pressure sufficient to fuse and permanently modify a cross-sectional dimension of at least a portion of the filaments in the fibers. In one non-limiting embodiment, the treatment temperature and/or pressure is decreased as compared to the temperature and/or pressure required to fuse and permanently modify the cross-sectional dimension of said portion of the filaments in the absence of the heat transfer liquid or vapor. In one non-limiting embodiment, the treatment is conducted at an increased speed as compared to the treatment speed required to fuse and permanently modify the cross-sectional dimension of said portion of the filaments at the same temperature and pressure but in the absence of the heat transfer liquid or vapor.

Another aspect of the present disclosure relates to fabric produced in accordance with the method described herein.

Fabric produced in accordance with the present method has low a dynamic air permeability. In one non-limiting embodiment, fabric produced in accordance with this method exhibits a dynamic air permeability (DAP) of 500 mm/s or lower when the fabric is unaged.

An aspect of the present disclosure is related to an article produced from the fabric. Non-limiting examples of such articles include airbags, sailcloths, inflatable slides, tents, ducts, apparel, filters, coverings and printed media.

Yet another aspect of the present disclosure relates to a method for accelerating the process speed at which hot roll calendering of a woven fabric is performed to attain a selected air permeability value, wherein the fabric has a tensile strength in the warp or weft direction of ≥1000N, said method comprising the step of hot roll calendering the fabric in the presence of an added heat transfer liquid or vapor, wherein at least one physical property of the fabric other than air permeability is improved as compared to that of the same fabric calendered in the absence of the added heat transfer liquid or vapor to attain the selected air permeability value.

In one non-limiting embodiment, the physical property improved by the hot roll calendering the fabric in the presence of an added heat transfer liquid or vapor comprises at least one of fabric tenacity, elongation at break, fabric toughness, tear strength, and edge comb resistance.

BRIEF DESCRIPTION OF THE DRAWINGS

FIGS. 4A and 4B show the surface structure at 2 different magnifications of the fabric which was HTHP treated dry at 5 m/min process speed. FIGS. 4C and 4D show the surface structure at 2 different magnifications of the fabric which was HTHP treated dry at 30 m/min process speed. FIGS. 4E and 4F show the surface structure at 2 different magnifications of the fabric which was HTHP treated wet at 30 m/min process speed.

FIGS. 6A and 6B show the surface structure at 2 different magnifications of the fabric which was HTHP treated dry at 5 m/min process speed. FIGS. 6C and 6D show the surface structure at 2 different magnifications of the fabric which was HTHP treated dry at 30 m/min process speed. FIGS. 6E and 6F show the surface structure at 2 different magnifications of the fabric which was HTHP treated wet at 30 m/min process speed.

DETAILED DESCRIPTION OF THE INVENTION

Figure 1:
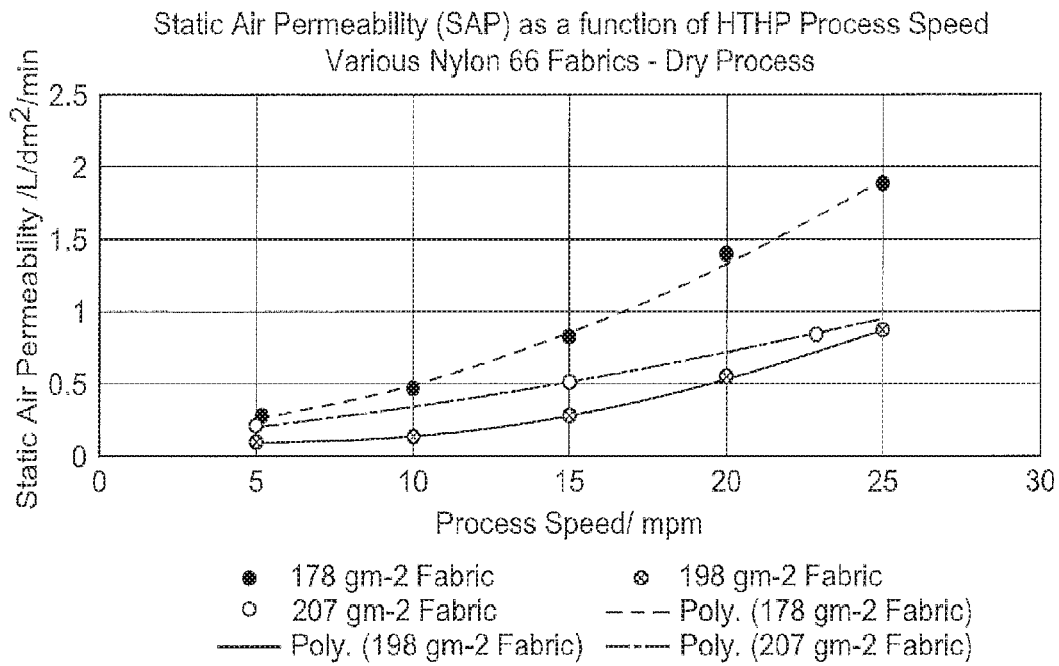
FIG. 1 is a line graph of SAP against High Temperature-High Pressure (HTHP) processing speed demonstrating the problem of increased SAP with increased process speed in processing the Nylon 6,6 fabrics of Example 1 (Comparative) in the absence of a heat transfer medium.

The present disclosure relates to a method for producing woven fabrics from synthetic fibers wherein the fabrics, in their uncoated form, have permanently reduced air permeability and porosity as compared to conventional uncoated fabrics formed from the same synthetic fibers at the same fabric construction.

The present method comprises weaving synthetic fibers in a warp direction and a weft direction to form a woven fabric having a top surface and a bottom surface, wherein the warp fibers and weft fibers each comprises one or more synthetic polymer filaments having substantially uniform cross-sectional composition. At least a portion of the filaments in the fibers on the top surface of the fabric and/or at least a portion of the filaments in the fibers on the bottom surface of the fabric are then fused together in the presence of a heat transfer liquid or vapor added during the fusing step or added in a prior step of the fabric production process and retained by the filaments. The fusing step produces a treated fabric having a tensile strength in both the warp and weft directions of 1000 N or greater and having, in the absence of any coating, a static air permeability (SAP) of 3 l/dm$^2$/min or lower.

In one non-limiting embodiment, the fusing step results in at least a portion of the filaments on the top surface and/or at least a portion of the filaments on the bottom surface of the treated fabric having a permanently modified cross-section. In another non-limiting embodiment, the fusing step results in a majority (at least half) of the filaments on the top surface of the treated fabric or a majority of the filaments on the bottom surface of the treated fabric having a permanently modified cross-section. In yet another non-limiting embodiment, the fusing step results in a majority (at least half) of the filaments on the top surface of the treated fabric and a majority of the filaments on the bottom surface of the treated fabric having permanently modified cross-section and that are fused together.

The combination of the flattening and fusing of the surface filaments results in a fabric with a reduced surface roughness. In one non-limiting embodiment of the present disclosure, the treated fabric produced by the method described herein has a root mean square (RMS) surface roughness in the range from about 2 to about 70 μm, preferably from about 5 to about 60 μm.

In one non-limiting embodiment of the present disclosure, the treated fabric has a dynamic air permeability (DAP) of 500 mm/s or lower when the fabric is unaged. All DAP values referred to herein are measured according to the modified version of ISO 9237 described below. All SAP values referred to herein are measured according to the modified version of ASTM D6476 described below.

The term "permanently modified cross-section," as used herein, refers to a filament cross section that is a modified or compressed version of the cross section of at least a portion of the filaments used in the untreated fabric. The filament within the fibers of the untreated fabric may have any cross-section known in the art, including but not limited to circular, multi-lobal, tri-lobal, hexalobal or rectangular. In one non-limiting embodiment, the filaments in the fibers of the untreated fabric have a circular cross-section. In one non-limiting embodiment, the permanently modified cross-section results in at least a portion of the fibers being substantially flat. See FIGS. 4A through 4F.

The term "permanent" or "permanently", as used herein, means the modified cross-section does not revert to its original shape.

The term "High Temperature-High Pressure (HTHP)" treatment as used herein, refers to treating the fabric at a selected temperature and/or selected pressure so that at least a portion of the filaments on the top surface or at least a portion of the filaments on the bottom surface of the treated woven fabric have a permanently modified cross-section and are fused together so that air permeability and porosity of the treated fabric is reduced as compared to woven fabrics formed from the same synthetic fibers without thermo-processing. It had previously been believed that HTHP treatment of a fabric, for example by calendering a fabric at elevated temperatures close to the melting point of the yarn, would result in thermally induced mechanical degradation of the fabric, a decrease in fabric tensile and tear strength, a resultant poor dimensional stability and a significant increase in stiffness. For example, previous attempts with high temperature and high pressure calendering of woven fabrics could lead to a paper-like stiff product and did not result in desirable fabric properties for use in applications such as airbag fabrics.

The inventors have surprisingly discovered that carrying out the HTHP treatment in the presence of a heat transfer liquid or vapor, preferably in combination with modified HTHP process conditions such as decreased temperature and/or pressure as compared to a temperature and/or pressure sufficient to permanently modify a cross-section and fuse at least a portion of the filaments in the fibers in the absence of a heat transfer liquid or vapor, enables an improved heat transfer which is sufficient to modify the surface filaments cross section and fuse such filaments to give permanent low permeability at an increased process speed, but not to damage the preferred structure in a way that reduces the strength of the fabric. Using the method of the present disclosure, previously disclosed low permeability fabrics can be produced at significantly higher process speeds.

Additionally, carrying out the HTHP treatment in the presence of a heat transfer liquid or vapor, in comparison to carrying out the HTHP treatment in the absence of a heat transfer liquid or vapor, leads to an improvement in fabric physical properties, comprising at least one of fabric tenacity, elongation at break, fabric toughness, tear strength, and edge comb resistance.

By the term "heat transfer liquid or vapor" it is meant a liquid or vapor that is included with the fibers or filaments during HTHP treatment, and is used as a processing accelerant to enable a throughput increase. In one nonlimiting embodiment, the heat transfer liquid is predominantly water.

As used herein, the term "unaged" means the treated fabric directly after being subjected to the step or steps resulting in fusion and preferably permanent shape modification of at least a portion of the filaments in the fibers on the top and/or bottom surface of the fabric.

As used herein, the term "substantially uniform cross-sectional composition" as used in relation to the filaments of each of the warp fibers and weft fibers means that the composition of the filament as measured at the center line of the filament (running in the direction of the length of the filament) is substantially the same as the composition measured at increasing radii from the center line. In one non-limiting embodiment, a majority (more than half) of the fibers used in the warp direction of the fabric are formed from one or more filaments made from a single synthetic polymer. In another non-limiting embodiment, a majority (more than half) of the fibers used in the weft direction of the fabric are formed from a single synthetic polymer. In another non-limiting embodiment, a majority of the fibers used in the warp direction and weft direction of the fabric are formed from one or more filaments made from a single synthetic polymer. In one non-limiting embodiment, all of the fibers used in the warp direction of the fabric are formed one or more filaments made from a single synthetic polymer. In another non-limiting embodiment, all of the fibers used in the weft direction of the fabric are formed from one or more filaments made from a single synthetic polymer. In another non-limiting embodiment, all of the fibers used in the warp direction and weft direction of the fabric are formed from one or more filaments made from a single synthetic polymer.

Examples of synthetic polymers used to produce the filaments and fibers employed in the present disclosure include, but are not limited to, polyamides, polyesters, polyolefins and blends or copolymers thereof.

In one non-limiting embodiment, the fibers used herein have a linear density in the range from about 150 to about 1000 decitex, preferably in the range from about 150 to about 750 decitex.

Suitable polyamide fibers have a linear mass density in the range from 100 to 1000 decitex, such as from 200 to 950 decitex, from 150 to 750 decitex, from 200 to 900 decitex, from 250 to 850 decitex, from 300 to 850 decitex, from 350 to 850 decitex, from 400 to 850 decitex, from 400 to 800 decitex and from 450 to 800 decitex. Suitable polyamide fibers include those formed from nylon 6,6; nylon 6; nylon 6,12; nylon 7; nylon 12; nylon 4,6; or copolymers or blends thereof. In one nonlimiting embodiment of the present disclosure, the base yarn is formed from a nylon 6,6 fiber.

Suitable polyester fibers have a linear mass density in the range of 100 to 950 decitex, such as from 150 to 750 decitex, from 300 to 900 decitex, from 300 to 850 decitex, from 350 to 850 decitex, from 400 to 850 decitex, from 400 to 800 decitex, from 450 to 800 decitex, and from 500 to 800 decitex. Suitable polyester fibers include those formed from polyethylene terephthalate (PET), polybutylene terephthalate, polyethylene naphthalate, polybutylene naphthalate, polyethylene-1,2-bis(phenoxy)ethane-4,4'-dicarboxylate, poly(1,4cyclohexylene-dimethylene terephthalate and copolymers comprising at least one type of recurring units of the above-mentioned polymers, for example, polyethylene terephthalate/isophthalate copolyesters, polybutylene terephthalate/naphthalate copolyesters, polybutylene terephthalate/decanedicarboxylate copolyesters, or copolymers or blends thereof. In one nonlimiting embodiment of the present disclosure, the base yarn is formed from a PET fiber.

The fibers used in the present disclosure may also comprise various additives used in the production and processing of fibers. Suitable additives include, but are not limited to a thermal stabilizer, antioxidant, photo stabilizer, smoothing agent, antistatic agent, plasticizer, thickening agent, pigment, flame retarder, filler, binder, fixing agent, softening agent or combinations thereof.

In one non-limiting embodiment, the filaments used to produce the fibers employed herein have a linear density in the range from about 1 to about 25 decitex per filament (DPF), such as in the range from about 2 to about 12 decitex per filament (DPF).

The woven fabric of the present disclosure may be formed from warp and weft fibers using weaving techniques known in the art. Suitable weaving techniques include, but are not limited to a plain weave, twill weave, satin weave, modified weaves of these types, one piece woven (OPW) weave, or a multi-axial weave. Suitable looms that can be used for weaving include a water jet loom, air jet loom or rapier loom. These looms can also be used in conjunction with a jacquard in order to create an OPW structure. Suitable woven fabrics of the present disclosure may have a total base weight in the range of 80 to 4500 grams per square meter. In certain embodiments, the total base weight of the woven fabric can range from 100 to 4500 grams per square meter, from 100 to 4000 grams per square meter, from 100 to 3500 grams per square meter, from 150 to 4500 grams per square meter, from 150 to 4000 grams per square meter, from 150 to 3500 grams per square meter, from 200 to 4500 grams per square meter, from 200 to 4000 grams per square meter, from to 200 to 3500 grams per square meter, from 250 to 4500 grams per square meter, from to 250 to 4000 grams per square meter, and from 250 to 3500 grams per square meter.

In one non-limiting embodiment of the present disclosure, the untreated woven fabric has a static air permeability (SAP) of greater than 3 l/dm²/min, such as greater than 5 l/dm²/min, for example greater than 10 l/dm²/min, when measured according to the test method described herein.

In one non-limiting embodiment of the present disclosure, the untreated woven fabric has a dynamic air permeability (DAP) of greater than 500 mm/s, such as greater than 750 mm/s, for example greater than 1000 mm/s, when measured according to the test method described herein.

In one non-limiting embodiment of the present disclosure, the untreated woven fabric has a tensile strength of the fabric in both the warp and weft directions of 1000 N or greater when the fabric is unaged. In another non-limiting embodiment of the present disclosure, the fabric has a tensile strength in both the warp and weft directions of 1500 N or greater when the fabric is unaged. In another non-limiting embodiment of the present disclosure, the fabric has a tensile strength in both the warp and weft directions of 2000 N or greater when the fabric is unaged. In one non-limiting embodiment of the present disclosure, the fabric has a tensile strength in both the warp and weft directions of 2500 N or greater when the fabric is unaged. In yet another non-limiting embodiment of the present disclosure, the fabric has a tensile strength in both the warp and weft directions of 3000 N or greater when the fabric is unaged.

In one non-limiting embodiment, the basis weight of the fabric is in the range from about 80 to about 500 gm$^{-2}$.

In accordance with the present disclosure, after the fibers described above have been woven in the warp direction and the weft direction to form a woven fabric with a top surface and a bottom surface, the resultant fabric is treated in the presence of a heat transfer medium to permanently modify the cross-section and fuse at least a portion of the filaments in the fibers on the top surface of the fabric or at least a portion of the filaments in the fibers on the bottom surface of the fabric. In one non-limiting embodiment, the treatment conditions to permanently modify the cross-section and fuse at least a portion of the filaments on the top surface of the fabric or a least a portion of the filaments on the bottom surface of the fabric are modified as compared to the conditions that would be used to fuse and permanently modify the cross-section of the filaments in the absence of the heat transfer medium. In one non-limiting embodiment, the processing temperature is decreased as compared to the temperature required to permanently modify a cross-section and fuse at least a portion of the filaments in the fabric in the absence of the heat transfer medium. In one non-limiting embodiment, the processing pressure is decreased as compared to a pressure required to permanently modify a cross-section and fuse at least a portion of the filaments in the fabric in the absence of a heat transfer medium. In one non-limiting embodiment, the processing temperature and pressure are decreased as compared to a temperature and pressure required to permanently modify a cross-section and fuse at least a portion of the filaments in the fabric in the absence of a heat transfer medium. In one non-limiting embodiment, the fabric is treated to permanently modify the cross-section and fuse at least a portion of the filaments on the top surface of the fabric and at least a portion of the filaments in the fibers on the bottom surface of the fabric. In another non-limiting embodiment the fabric is treated in order to permanently modify the cross-section and fuse at least a majority of the filaments on the top surface of the fabric or a majority of the filaments on the bottom surface of the fabric. In yet another non-limiting embodiment, the fabric is treated to permanently modify the cross-section and fuse a majority of the filaments on the top surface of the fabric and a majority of the filaments on the bottom surface of the fabric.

The temperature and pressure used in the HTHP treatment are selected so as permanently modify the cross-section and fuse at least a portion of the filaments in the fabric, but not to damage the filaments and reduce the strength of the fabric. In non-limiting embodiments, the temperature used is above the softening temperature of the fibers. In another non-limiting embodiment the temperature is below the conventional dry polymer softening point. In a non-limiting embodiment, fabrics formed from nylon 6,6 fibers may be HTHP treated at temperatures ranging from about 130° C. to about 240° C. In another non-limiting embodiment, fabrics formed from PET fibers may be HTHP treated at temperatures ranging from about 130° C. to about 240° C. In non-limiting embodiments, the pressure used in the HTHP treatment ranges from about 28 Mpa to about 115 MPa, such as from about 35 MPa to about 70 MPa. Where the HTHP treatment is effected by hot roll calendering, the pressure is calculated from the total applied force on the area of fabric at the calender nip point. The fabrics may be HTHP treated by any method known in the art to apply temperatures and pressures necessary to permanently modify the cross-section and fuse at least a portion of the filaments in the fabric. In one nonlimiting embodiment, the HTHP treatment comprises hot roll calendering the fabric. Where the HTHP treatment is effected by hot roll calendering, the fabric speed over the calender nip point may range from about 5 m/min to about 80 m/min, such as from about 10 m/min to about 70 m/min, for example from about 12 m/min to about 50 m/min.

In one non-limiting embodiment, the fabric is HTHP treated in the presence of a heat transfer medium present in an amount from about 5 to about 30 weight %, for example from about 10 to about 20 weight %, such as from about 12 to about 18 weight %, based on the weight of the dry fabric. In non-limiting embodiments the heat transfer liquid or vapor may be present as a result of carry-over from a preceding step in the fabric production process, not limited to residual liquid from a water jet loom, or from a washing or scouring process, or from a dyeing process. In one non-limiting embodiment, the component is a liquid, in another it is a vapor. In another non-limiting embodiment, the liquid or vapor may be applied by a bath, or by a foulard liquid application system or by a liquid spray system or by a vapor phase application system. The heat transfer liquid or vapor should be inert or benign so as not to damage the fabric, and may be any liquid or vapor fitting that description. In one non-limiting embodiment, the heat transfer liquid comprises water or the heat transfer vapor comprises steam.

In one non-limiting embodiment of the present disclosure, the disclosed HTHP treated woven fabric has a static air permeability (SAP) of 3 l/dm²/min or lower, such as 2 l/dm²/min or lower, for example 1 l/dm²/min or lower when the fabric is unaged and when measured according to the test method described herein.

In one non-limiting embodiment of the present disclosure, the HTHP treated woven fabric has a dynamic air permeability (DAP) of 500 mm/s or lower, such as 200 mm/s or lower, for example 100 mm/s or lower when the fabric is unaged and when measured according to the test method described herein.

In one non-limiting embodiment of the present disclosure, the HTHP treated woven fabric has a tensile strength of the fabric in both the warp and weft directions of 1000 N or greater when the fabric is unaged. In another non-limiting embodiment of the present disclosure, the fabric has a tensile strength in both the warp and weft directions of 1500 N or greater when the fabric is unaged. In another non-limiting embodiment of the present disclosure, the fabric has a tensile strength in both the warp and weft directions of 2000 N or greater when the fabric is unaged. In one non-limiting embodiment of the present disclosure, the fabric has a tensile strength in both the warp and weft directions of 2500 N or greater when the fabric is unaged. In yet another non-limiting embodiment of the present disclosure, the fabric has a tensile strength in both the warp and weft directions of 3000 N or greater when the fabric is unaged.

In one non-limiting embodiment of the present disclosure, the treated fabric produced by the method described herein has a static air permeability (SAP) of 1 l/dm$^2$/min or lower when the fabric is unaged, a dynamic air permeability (DAP) of 500 mm/s or lower when the fabric is unaged, and a tensile strength in both the warp and weft directions of 1000 N or greater when the fabric is unaged.

In one non-limiting embodiment, the tear strength of the disclosed HTHP treated fabric in both the warp and weft directions is 60 N or greater when the fabric is unaged. In another non-limiting embodiment, the tear strength of the fabric in both the warp and weft directions is 120 N or greater when the fabric is unaged. All tear strength values referred to herein are measured according to the modified version of ISO 13937-2 described below.

In one non limiting embodiment, the edgecomb resistance of the disclosed HTHP treated fabric in both the warp and weft directions is 150 N or greater when the fabric is unaged. In another non limiting embodiment, the edgecomb resistance of the fabric in both the warp and weft directions is 175 N or greater when the fabric is unaged. All edgecomb resistance values referred to herein are measured according to the modified version of ASTM D6479 described below.

In one non-limiting embodiment of the present disclosure, the treated fabric produced by the method described herein has a root mean square (RMS) surface roughness in the range from about 2 to about 70 μm, preferably from about 5 to about 60 μm. All RMS values referred to herein are measured according to the method described in the test methods section.

In one non-limiting embodiment, a portion of the filaments in the treated fabric have an aspect ratio of from about 1.2:1 to about 10:1. Where an aspect ratio of 1:1 describes a filament cross section with a common radius from its center to its outer surface. For example a filament with a circular cross section has an aspect ratio of 1:1. Filaments on the surface of the fabric of the present invention have a flattened cross section in at least 1 dimension and so have an aspect ratio of >1.2:1.

Yet another aspect of the present disclosure relates to a method for accelerating the process speed at which hot roll calendering of a woven fabric is performed to attain a selected air permeability value, wherein the fabric has a tensile strength in the warp or weft direction of ≥1000N, said method comprising the step of hot roll calendering the fabric in the presence of an added heat transfer liquid or vapor, wherein at least one physical property of the fabric other than air permeability is improved as compared to that of the same fabric calendered in the absence of the added heat transfer liquid or vapor to attain the selected air permeability value.

In one non-limiting embodiment, the physical property improved by the hot roll calendering the fabric in the presence of an added heat transfer liquid or vapor comprises at least one of fabric tenacity, elongation at break, fabric toughness, tear strength, and edge comb resistance.

In one non-limiting embodiment, the tensile strength of the resulting fabric is at least 85% that of the fabric prior to the hot roll calendering step.

In one non-limiting embodiment, the method further comprises applying an optional coating, or film to the HTHP treated fabric to further decrease air permeability. If the fabrics are coated any coating, web, net, laminate or film known to those skilled in the art may be used in impart a decrease in air permeability. Examples of suitable coating include, but are not limited to polychloroprene, silicone based coatings, polydimethylenesiloxane, polyurethane and rubber compositions. Examples of suitable webs, nets and films include but are not limited to polyurethane, polyacrylate, polyamide, polyester, polyolefins, polyolefin elastomers and blends and copolymers thereof. Films may be single or multilayer and may be comprised of any combination of webs, nets or films. In these embodiments, fabric of the current invention may be used as a lower permeability and flatter substrate than fabrics with the same construction coated with the conventional amount of coating, film or laminate. This will allow for a lower weight coating, or a lighter or simplified web, net, laminate or film structure to be applied, and still meet very low permeability specifications.

Fabrics produced in accordance with the method described herein meet mechanical and performance standards while limiting overall fabric weight and cost. The disclosed fabric structure enables a lighter weight coating to be applied and still achieve an impermeable fabric similar to that achievable with conventional non HTHP treated fabrics.

In addition, the fabric produced in accordance with the method of the present disclosure is expected to have improved thermal resistance without the need for additives but arising from the HTHP processing in comparison to the original fabric before HTHP processing. This enhanced thermal resistance partially compensates for the improvement to thermal resistance which is imparted by coating the fabric at conventional coating weights with conventional airbag coatings such as, but not limited to, silicones. The enhanced thermal resistance improves the resilience of the fabric to hot airbag module inflators in comparison to uncoated fabrics.

Further, the fabrics of the present disclosure demonstrate good packability, as compared to fabrics not HTHP-processed. As is demonstrated in Examples of the present disclosure, for a wide range of process conditions, HTHP processed fabrics have improved packability in comparison to their non-processed counterparts More specifically, fabric of the present disclosure is expected to exhibit improved uniformity of air permeability across the width of the fabric in comparison to the original fabric before HTHP treatment. Conventional woven fabrics which have not been coated, do not include additives, or had films, nets or webs adhered to them, show a non-uniform air permeability profile across the fabric width, with a tendency to lower permeability in the centre of the fabric and higher permeability towards and at the edges of the fabric. This non-uniformity in permeability has to be compensated for in the overall design of the fabric and the airbag such that increased construction and heavier fabrics may need to be used, or coating may need to be added. Both of these factors make the fabric less packable. The fabric of the present disclosure may be used at lower construction and weight, with no coating or a reduced amount of coating as a result of the low and uniform permeability across the fabric width. This leads to a more packable fabric.

Also provided in the present disclosure are articles formed from the woven fabrics and methods for their production disclosed herein. In one nonlimiting embodiment of the present disclosure, the fabric is used to produce a product such as automobile airbags, sailcloth, inflatable slides, temporary shelters, tents, ducts, coverings and printed media. The term airbags, as used herein, includes airbag cushions. Airbag cushions are typically formed from multiple panels of fabrics and can be rapidly inflated. Fabric of the present disclosure can be used in airbags sewn from multiple pieces of fabric or from a one piece woven (OPW) fabric. One Piece Woven (OPW) fabric can be made from any method known to those skilled in the art.

All patents, patent applications, test procedures, priority documents, articles, publications, manuals, and other documents cited herein are fully incorporated by reference to the extent such disclosure is not inconsistent with this invention and for all jurisdictions in which such incorporation is permitted.

ABBREVIATIONS

DAP—dynamic air permeability
dtx—decitex
N66—nylon 6,6
PET—polyethylene terephthalate
SAP—static air permeability
SEM—scanning electron microscopy
HTHP—high temperature high pressure
OPW—one piece woven

EXAMPLES

The following Examples demonstrate the present disclosure and its capability for use. Further, the invention is capable of other and different embodiments, and its several details are capable of modifications in various apparent respects, without departing from the scope and spirit of the present disclosure. Accordingly, the Examples are to be regarded as illustrative in nature and non-limiting.

Test Methods

All of the test standards and methods used herein are ASTM or ISO methods with specific amendments.

The Dynamic Air Permeability (DAP or ADAP) is defined as the average velocity (mm/s) of air or gas in the selected test pressure range of 30-70 kPa, converted to a pressure of 100 kPa (14.2 psi) and a temperature of 20° C. Another parameter, the curve exponent E (of the air permeability curve), is also measured automatically during Dynamic Air Permeability testing but this has no units. Dynamic Air Permeability is tested according to test standard ASTM D6476 but with the following amendments:
1. The limits of the measured pressure range (as set on the test instrument) are 30-70 kPa
2. The start pressure (as set on the test instrument) is to be adjusted to achieve a peak pressure of 100+/−5 kPa.
3. The test head volume will be 400 cm$^3$ unless the specified start pressure cannot be achieved with this head, in which case one of the other interchangeable test heads (volumes 100, 200, 800 & 1600 cm$^3$) should be used as is found to be appropriate for the fabric under test.
4. At least six (6) tests have been carried out on each fabric sample and the reported result is the mean value in units of mm/s.

The Static Air Permeability (SAP—in units of l/dm$^2$/min) is tested according to test standard ISO 9237 but with the amendments as listed below:
1. The test area is 100 cm$^2$
2. The test pressure (partial vacuum) is 500 Pa.
3. Each individual test value is corrected for edge leakage.
4. At least six (6) tests have been carried out on each fabric sample and the reported Static Air Permeability result is the mean value in units of l/dm$^2$/min.

Fabric tensile testing, measuring both maximum force (N) & elongation at maximum force (%), is tested according to standard ISO 13934-1 but with the amendments as listed below:
1. The initial gauge (clamp) length set on the Instron tensile tester is 200 mm
2. The Instron crosshead speed is set at 200 mm/min
3. Fabric specimens are cut initially to size 350×60 mm but are then frayed down by unravelling the long edge threadlines to a testing width of 50 mm.
4. Tensile testing is done on 5 specimens cut from each test fabric avoiding any areas within 200 mm of the fabric selvedges.
5. The reported result for maximum force (also known as breaking force or breaking load) is the average of the maximum force results of all tests in Newtons (N).

Tear force (also known as tear strength)—in Newtons (N) is tested according to standard ISO 13937-2 but with the amendments as listed below:
1. The fabric specimen size is 150 mm×200 mm (with a 100 mm slit extending from the midpoint of the narrow end to the center.
2. Tear testing is done on 5 specimens cut from each test fabric avoiding any areas within 200 mm of the fabric selvedges. The reported value is the average of all tests carried out.
3. Warp direction tear results are obtained from tested specimens where the tear is made across the warp (i.e. warp threadlines are torn) whilst weft direction results are obtained from tested specimens where the tear is made across the weft (i.e. weft threadlines are torn).
4. Each leg of the specimens is to be folded in half to be secured in the Instron clamp grips according to ISO 13937-2 annex D/D.2
5. Evaluation of test results is according to ISO 13937-2 section 10.2 "Calculation using electronic devices".

Edgecomb resistance testing (also known as edge pullout testing)—in Newtons (N) is conducted according to standard ASTM D6479 but with the amendments as listed below:
1. The edge distance is 5 mm—this is the distance between the end of the test specimen (which during testing is positioned on a narrow ledge machined in the test specimen holder) & the line of pins which perform the "pullout", ie this is the length of the section of threadlines pulled out during the test.
6. Edgecomb resistance testing is done on 5 specimens cut from each test fabric avoiding any areas within 200 mm of the fabric selvedges. The reported value is the average of all tests carried out.

Root mean square (RMS) fabric surface roughness testing is conducted as follows.
a. A laser profilometer instrument was used to determine the surface roughness of the fabrics. Datasets were collected over an area 20 mm×20 mm with a scan resolution of 10 um in both the X and Y directions. Data was collected using a Talyor Hobson—Talysurf CLI 1000 scanning laser profilometer (v 2.5.3) utilizing a Keyence LK-030 laser. Analysis was performed using Talymap Platinum 4.0 (Mountains v 4.0.5.3985). The RMS roughness was calculated in accordance with EUR 15178 EN after form removal (5th order polynomial) and leveling (least-squares).

Example 1—Comparative Example

Nylon 6,6 polymer fibers with the following properties: 470 decitex, 136 Filament and 81 cN/tex tenacity were woven in the warp direction and weft direction to produce fabrics of 3 different constructions and weights, namely 178 $gm^{-2}$, 198 $gm^{-2}$ and 207 $gm^{-2}$. The fabrics were treated on both the top and bottom surface by passing twice through a calendering machine with heated roll in the absence of a heat transfer medium. The process conditions were as follows: 57 MPa pressure via a calender nip roll with force 400 N/mm of fabric width, with the heated roll at 225° C., over the range of 5 to 25 m/min process speed. The results are summarized in FIG. 1, which shows that as the process speed is increased the resultant permeability of each fabric is increased.

Example 2—Comparative Example

Figure 2:
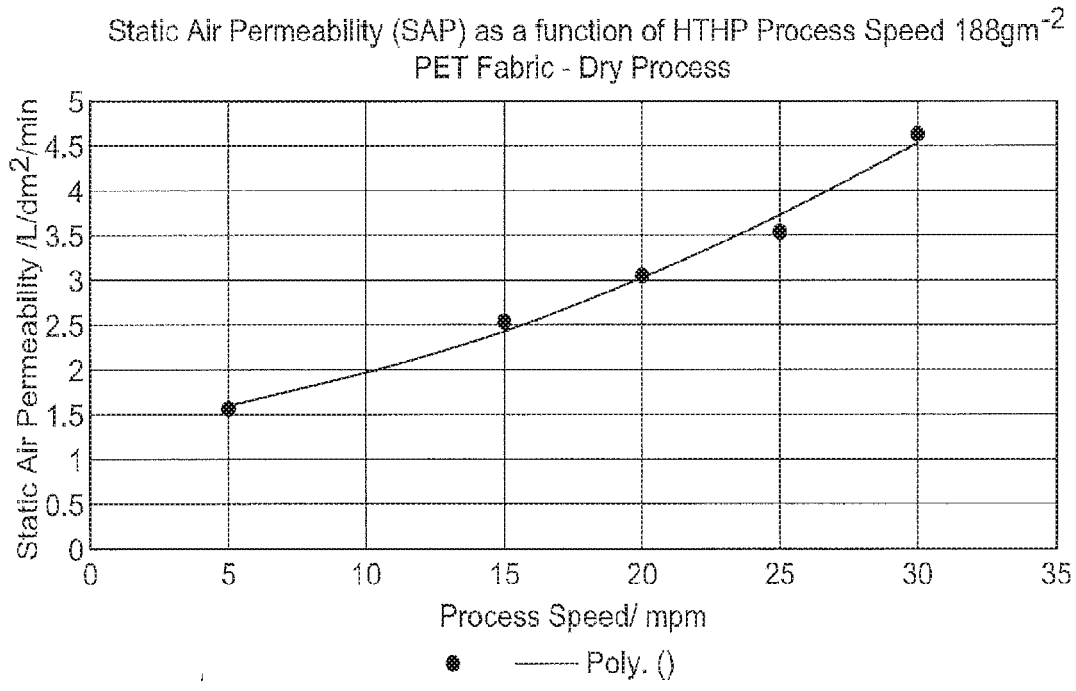
FIG. 2 is a line graph of SAP against HTHP processing speed demonstrating the problem of increased SAP with increased process speed in processing the PET fabrics of Example 2 (Comparative) in the absence of a heat transfer medium.

High tenacity 470 decitex PET polymer fibers were woven on a water jet loom in the warp direction and weft direction in a 185×185 threadline/dm construction to produce a fabric of 188 $gm^{-2}$ weight. The fabric was dried and then HTHP treated on both the top and bottom surface by passing twice through a calendering machine with heated roll. The process conditions were as follows: 43 MPa pressure via a calender nip roll with force 300 N/mm of fabric width, with the heated roll at 220° C., over the range of 5 to 30 m/min process speed. The results are summarized in FIG. 2, which shows that as the process speed is increased, the resultant permeability of the fabric has increased.

Example 3

Figure 3A:
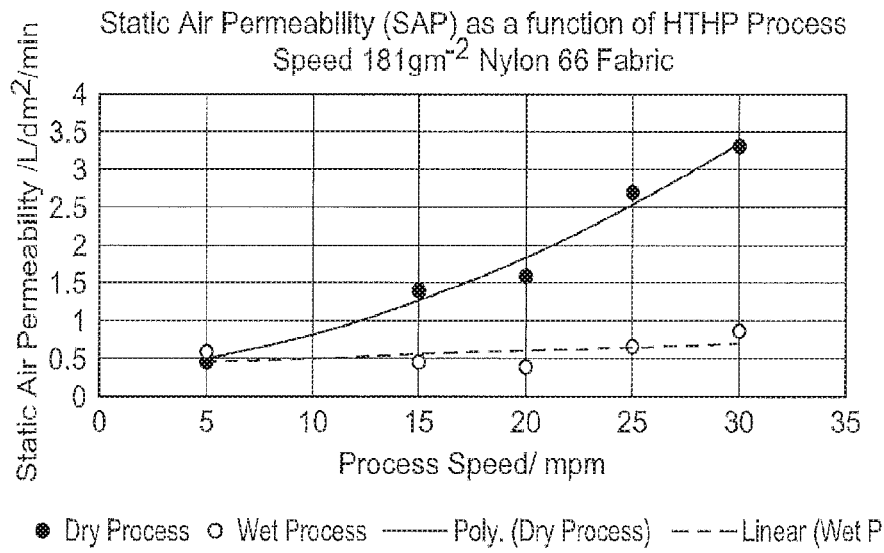
FIGS. 3A and 3B are line graphs of SAP (FIG. 3A) and DAP (FIG. 3B) against HTHP processing speed for the processing of the Nylon 6,6 fabric of Example 3 with and without a heat transfer medium.
Figure 3B:
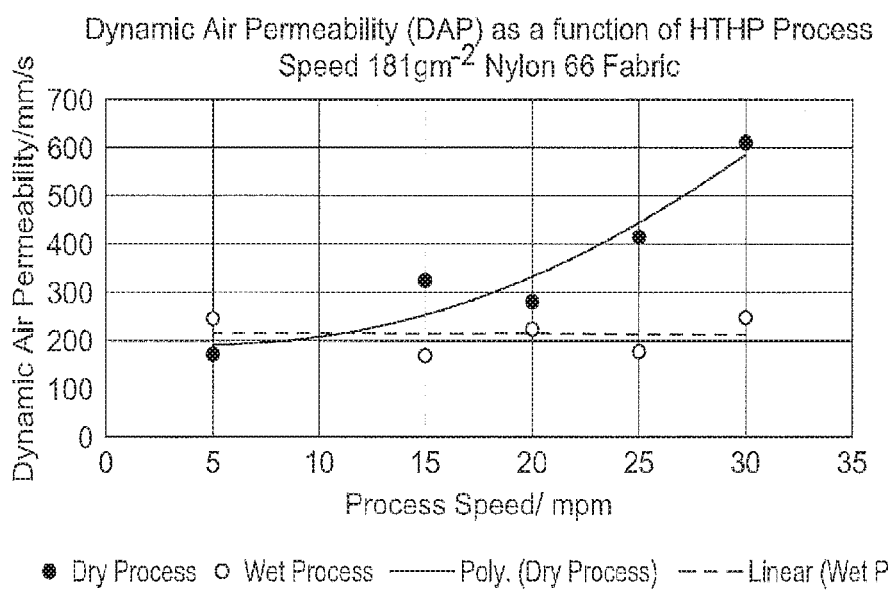

Nylon 6,6 polymer fibers with the following properties: 470 decitex, high tenacity fibers were woven in the warp direction and weft direction on a water jet loom to produce a fabric of 180×170 threadline/dm construction and 181 $gm^{-2}$ weight. The fabric was treated to a dry and a wet calendering process. In both cases the fabric was treated on both the top and bottom surface by passing twice through a calendering machine with heated roll. For the dry process the conditions were as follows: 43 MPa pressure via a calender nip roll with force 300 N/mm of fabric width, with the heated roll at 225° C., over the range of 5 to 30 m/min process speed. For the wet process the same fabric was pre-treated by a water spray system to give a uniform 15% by weight water concentration across the top and bottom surfaces of the fabric. For the wet process the conditions were as follows: 43 MPa pressure via a calender nip roll with force 300 N/mm of fabric width, with the heated roll at 168° C., over the range of 5 to 30 m/min process speed. The results are summarized in FIGS. 3A and 3B, which show that as the process speed is increased the resultant permeability of the dry fabric is increased, whereas the wet fabric maintains a lower permeability.

Table 1 shows the physical property results for some of the fabrics described in Example 3. Sample 1 is the fabric which was HTHP treated dry at 5 m/min process speed. Sample 2 is the same fabric processed dry at 30 m/min. Sample 3 is the same fabric processed wet at 30 m/min. Fabric physical properties are at least maintained for Sample 3 and the permeability remains low.

TABLE 1

| Sample | SAP ($l/dm^2/min$) | DAP (mm/s) | Weight ($g/m^2$) | Tensile (N/50 mm) | Tear Strength (N) | Edge-comb (N) |
|---|---|---|---|---|---|---|
| 1 | 0.46 | 173 | 181 | 2670 | 158 | 289 |
| 2 | 3.3 | 614 | 181 | 3008 | 206 | 231 |
| 3 | 0.86 | 248 | 181 | 3124 | 177 | 349 |

Figure 4A:
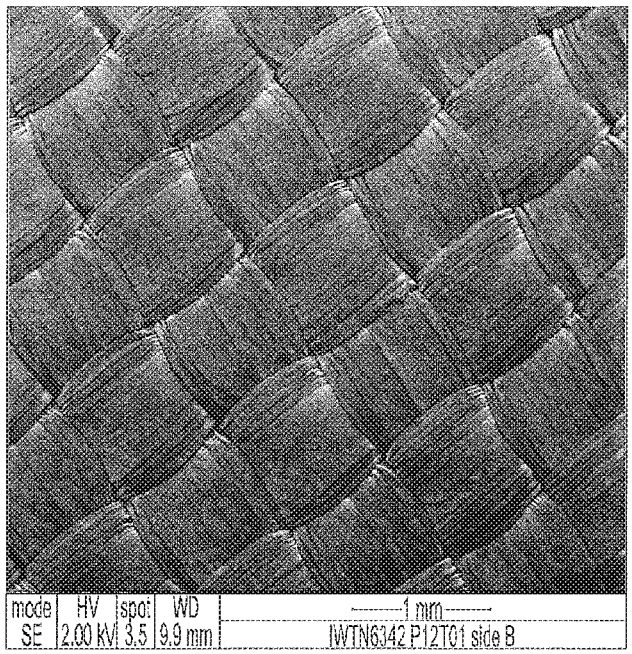
FIGS. 4A through 4F are SEM images of the fabrics described in Example 3 after dry and wet HTHP processing.
Figure 4B:
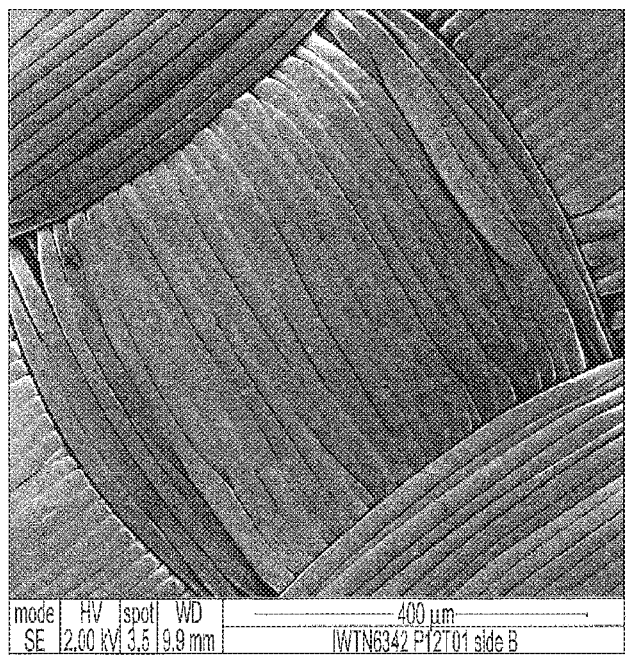
Figure 4C:
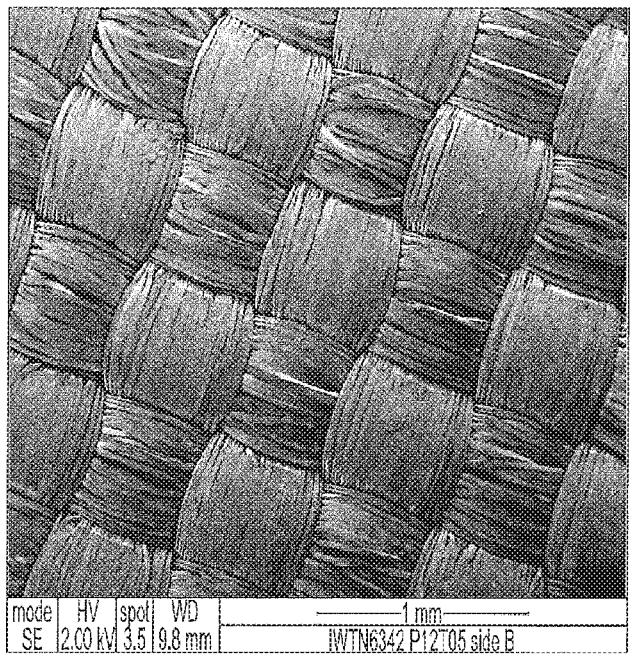
Figure 4D:
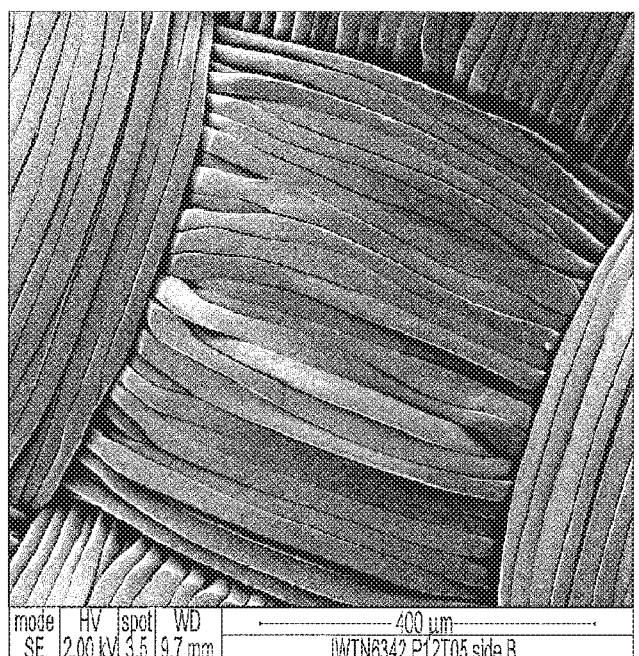
Figure 4E:
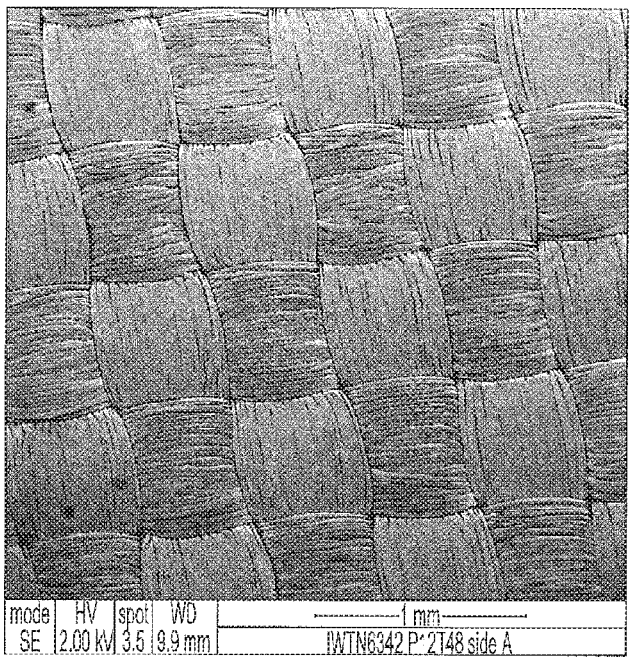
Figure 4F:
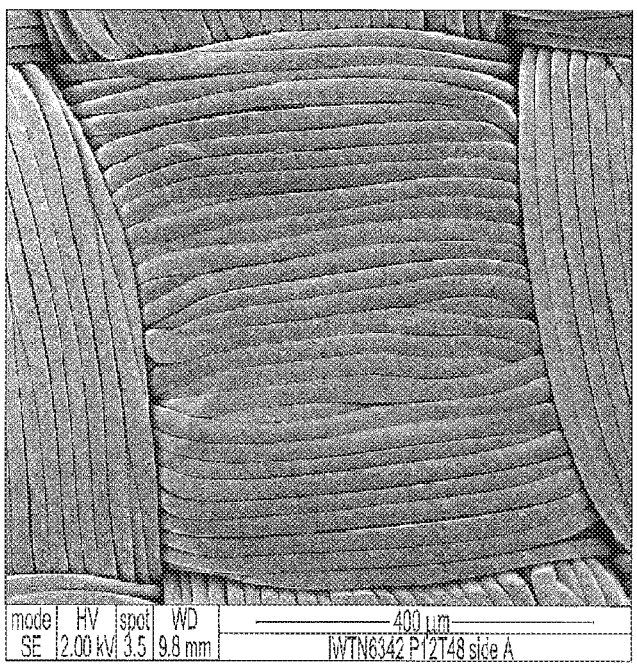

FIGS. 4A through 4F are SEM images of the fabrics described in Example 3 after dry and wet calendering. FIGS. 4A and 4B show the surface structure at 2 different magnifications of the fabric which was HTHP treated dry at 5 m/min process speed. FIGS. 4C and 4D show the surface structure at 2 different magnifications of the fabric which was HTHP treated dry at 30 m/min process speed. FIGS. 4E and 4F show the surface structure at 2 different magnifications of the fabric which was HTHP treated wet at 30 m/min process speed. While not being bound by any particular theory, the fabric shown in FIGS. 4A and 4B has surfaces that have permanently flattened filaments of which at least a portion are fused together. There is overlap across the warp and weft intersections and interstices which leads to the fabric having a very low permeability. FIGS. 4C and 4D show fabric that was HTHP treated dry at a much faster process speed has some similar features to the fabric in FIGS. 4A and 4B, but the degree of filament flattening, filament fusion, and overlap at the warp and weft intersections is less. Hence, the permeability of the fabric, although being lower than the original control fabric, is higher than the fabric shown in FIGS. 4A and 4B. FIGS. 4E and 4F have surface features much closer to those of the fabric in FIGS. 4A and 4B. This is believed to be due to the enhanced heat transfer imparted by the water which was added during the HTHP process. This causes the permeability of the fabric shown in FIGS. 4E and 4F to be very low and much closer to the permeability of the fabric shown in FIGS. 4A and 4B even though the processing speed of the fabric shown in FIGS. 4E and 4F is much faster than that of the fabric shown in FIGS. 4A and 4B.

Example 4

Figure 5A:
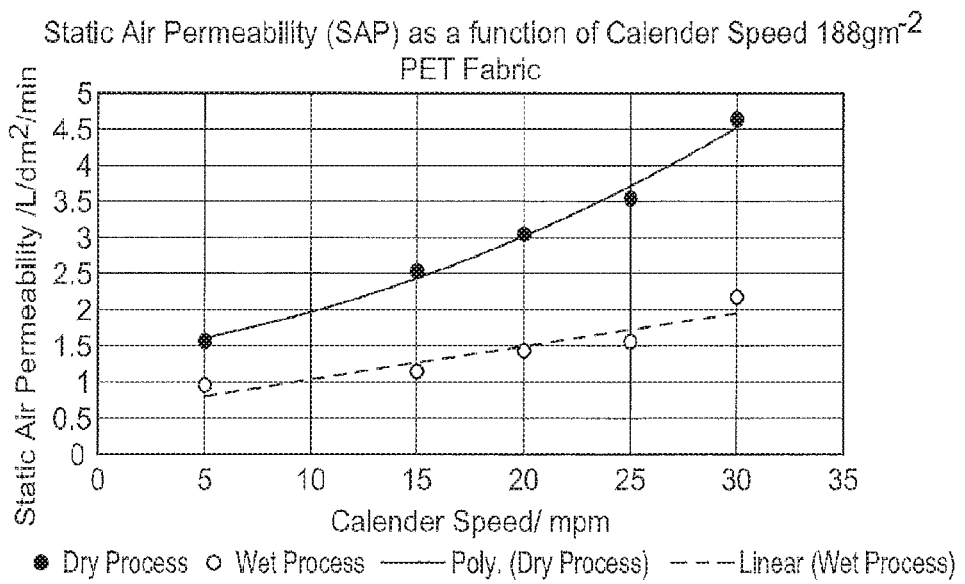
FIGS. 5A and 5B are line graphs of SAP (FIG. 5A) and DAP (FIG. 5B) against HTHP processing speed for the processing of the PET fabric of Example 4 with and without a heat transfer liquid or vapor.
Figure 5B:
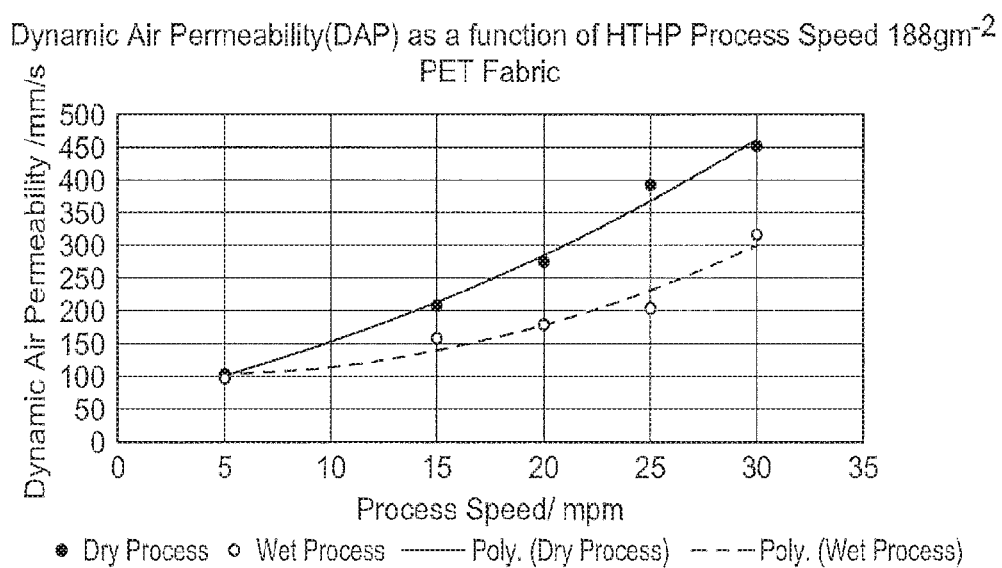

High tenacity 470 decitex PET polymer fibers were woven on a water jet loom in the warp direction and weft direction in an 185×185 threadline/dm construction to produce a fabric of 188 $gm^{-2}$ weight. The fabric was dried and then HTHP treated on both the top and bottom surface by passing twice through a calendering machine with heated roll. The process conditions were as follows: 43 MPa pressure via a calender nip roll with force 300 N/mm of fabric width, with the heated roll at 220° C., over the range of 5 to 30 m/min process speed. For the wet process the same fabric was pre-treated by a water spray system to give a uniform 15% by weight water concentration across the top and bottom surfaces of the fabric. The HTHP conditions were as follows: 43 MPa pressure via a calender nip roll with force 300 N/mm of fabric width, with the heated roll at 190° C., over the range of 5 to 30 m/min process speed. The results are summarized in FIGS. 5A and 5B, which show that as the process speed is increased the resultant permeability of the dry fabric is increased, whereas the wet fabric maintains a lower permeability at all process speeds.

Table 2 shows the physical property results for some of the fabrics described in Example 4. Sample 1 is the fabric which was HTHP treated dry at 5 m/min process speed. Sample 2 is the same fabric processed dry at 30 m/min. Sample 3 is the same fabric processed wet at 30 m/min. Fabric physical properties are at least maintained for sample 3 and the permeability remains low.

TABLE 2

| Sample | SAP (l/dm$^2$/min) | DAP (mm/s) | Weight (g/m$^2$) | Tensile (N/50 mm) | Tear Strength (N) | Edge-comb (N) |
|---|---|---|---|---|---|---|
| 1 | 1.6 | 104 | 188 | 3001 | 135 | 339 |
| 2 | 4.6 | 452 | 188 | 2875 | 156 | 266 |
| 3 | 2.2 | 318 | 188 | 3065 | 123 | 337 |

Figure 6A:
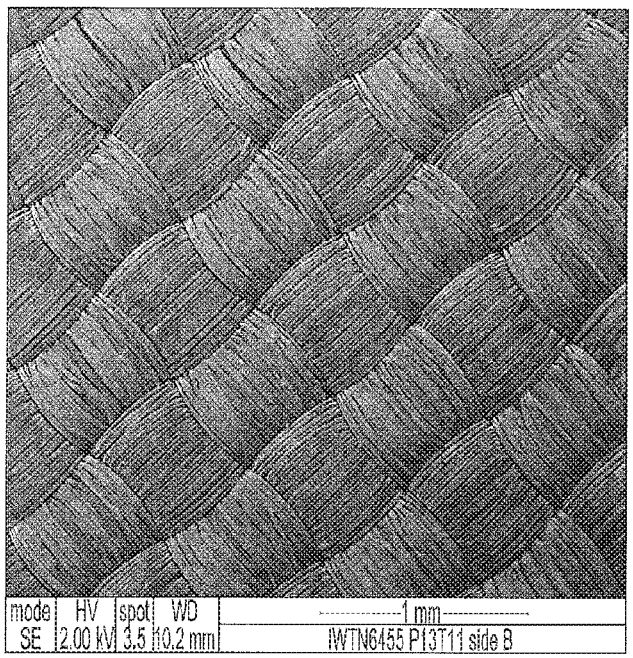
FIGS. 6A through 6F are SEM images of the fabrics described in Example 4 after dry and wet HTHP processing.
Figure 6B:
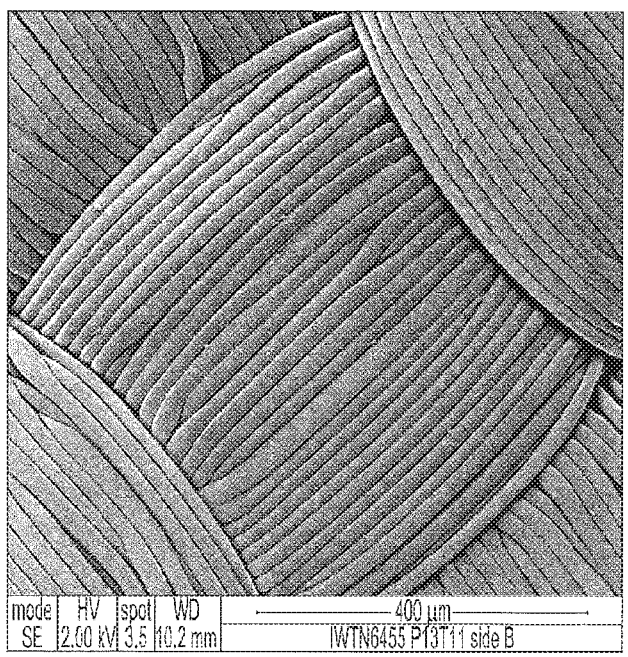
Figure 6C:
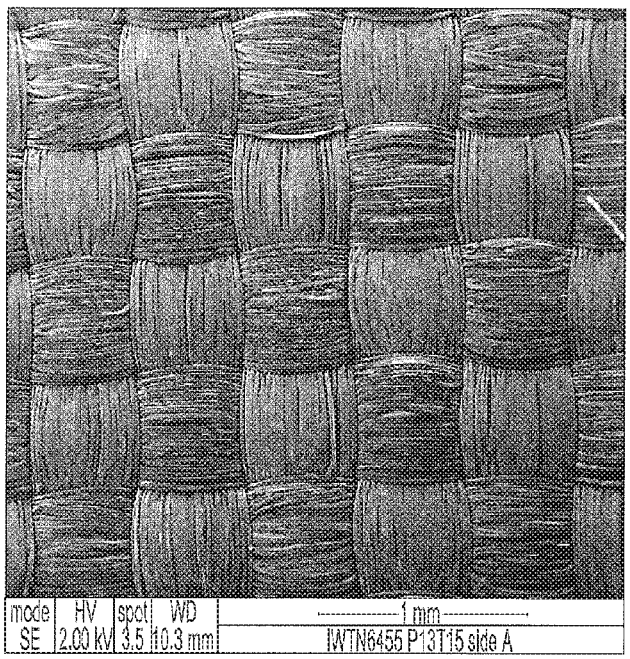
Figure 6D:
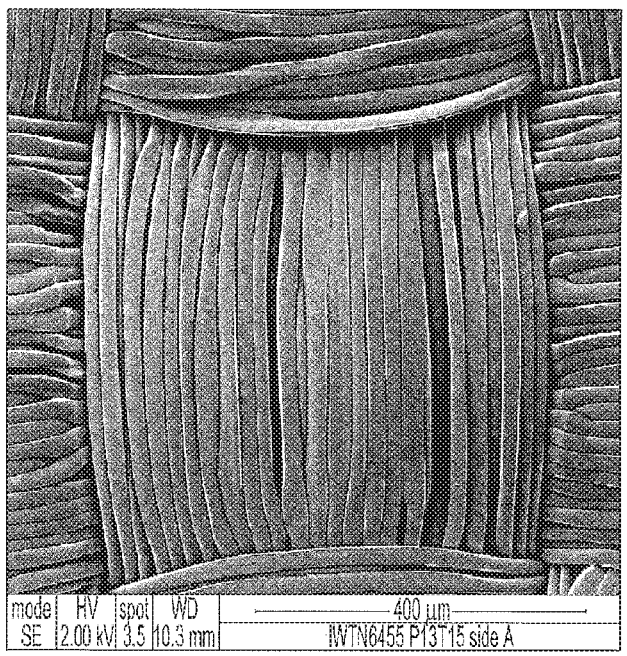
Figure 6E:
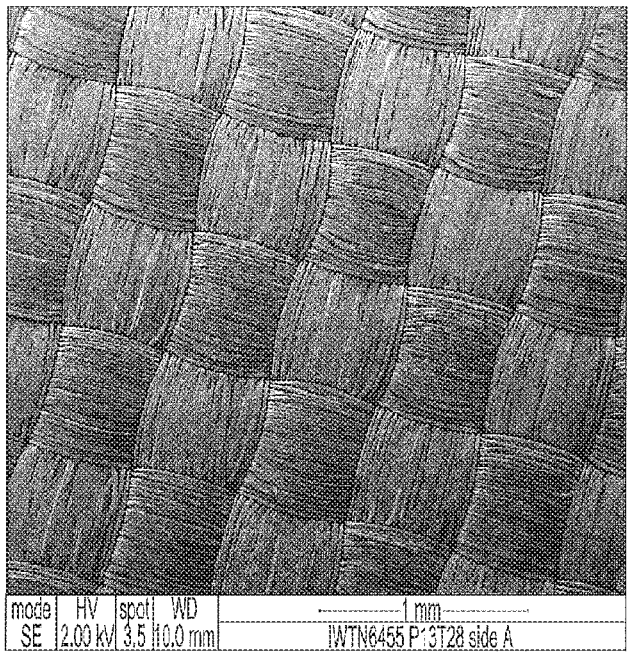
Figure 6F:
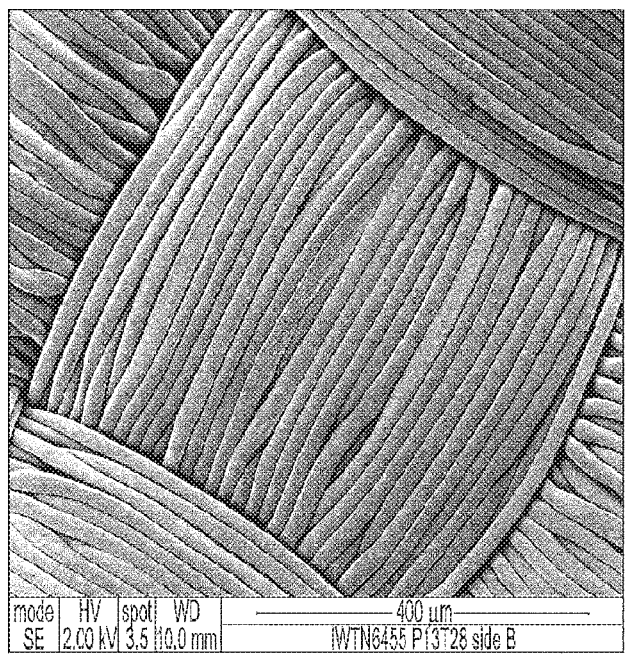

FIGS. 6A through 6F are SEM images of the fabrics described in Example 4 after dry and wet calendering. FIGS. 6A and 6B show the surface structure at 2 different magnifications of the fabric which was HTHP treated dry at 5 m/min process speed. FIGS. 6C and 6D show the surface structure at 2 different magnifications of the fabric which was HTHP treated dry at 30 m/min process speed. FIGS. 6E and 6F show the surface structure at 2 different magnifications of the fabric which was HTHP treated wet at 30 m/min process speed. Whilst not been bound by any particular theory the fabric shown in FIGS. 6A and 6B has surfaces that have permanently flattened filaments of which at least a portion are fused together. There is overlap across the warp and weft intersections and interstices—this leads to the fabric having a very low permeability. FIGS. 6C and 6D showing fabric that was HTHP treated dry at a much faster process speed has some similar features to the fabric in FIGS. 6A and 6B, but the degree of filament flattening, filament fusion, and overlap at the warp and weft intersections is less. Hence, the permeability of the fabric, although being lower than the original control fabric, is higher than the fabric shown in FIGS. 6A and 6B. FIGS. 6E and 6F have surface features closer to those of the fabric in FIGS. 6A and 6B. This is believed to be due to the enhanced heat transfer imparted by the water which was added during the HTHP process. This causes the permeability of the fabric shown in FIGS. 6E and 6F to be very low and closer to the permeability of the fabric shown in FIGS. 6A and 6B even though the processing speed of the fabric shown in FIGS. 6E and 6F is much faster than that of the fabric shown in FIGS. 6A and 6B.

Example 5

Nylon 6,6 polymer fiber with the following properties: 470 decitex, high tenacity fiber was woven in the warp direction and weft direction on a rapier loom to produce a fabric of 170×170 threadlines/dm construction and 173 gm$^{-2}$ weight. The fabric was treated to wet calendering process at 2 different temperatures and pressures. In both cases fabrics were pre-treated by a water spray system to give a uniform 15% by weight water concentration across the top and bottom surfaces of the fabric. The fabrics were treated on both the top and bottom surface by passing twice through a calendering machine with heated roll. For the non optimized process the conditions were as follows: 57 MPa pressure via a calender nip roll with force 400 N/mm of fabric width, with the heated roll at 225° C., at 15 m/min process speed. For the optimized process, the fabric conditions were as follows: 43 MPa pressure via a calender nip roll with force 300 N/mm of fabric width, with the heated roll at 175° C., at 15 m/min process speed. The results are summarized in Table 3 and show that, for optimal results, the wet HTHP process conditions should be altered from the high temperatures typically used during the dry HTHP process in order to achieve the desired balance of low permeability and high tensile strength.

TABLE 3

| HTHP Process | SAP (l/dm$^2$/min) | Tensile (N/50 mm) |
|---|---|---|
| Non Optimised Temperature | 0.15 | 1336 |
| Optimised Temperature | 0.65 | 2655 |

Figure 7A:
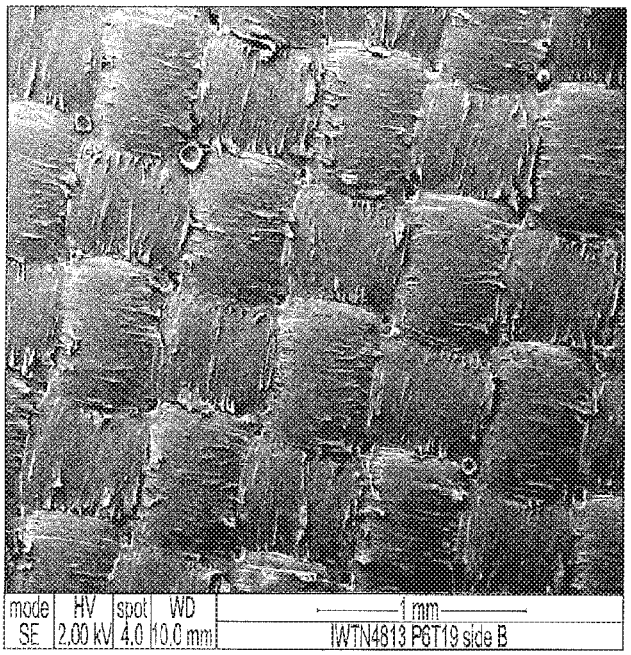
FIGS. 7A through 7D are SEM images which show the surface structure at 2 different magnifications of the fabrics described in Example 5 after wet HTHP processing under two different temperature and pressure conditions.
Figure 7B:
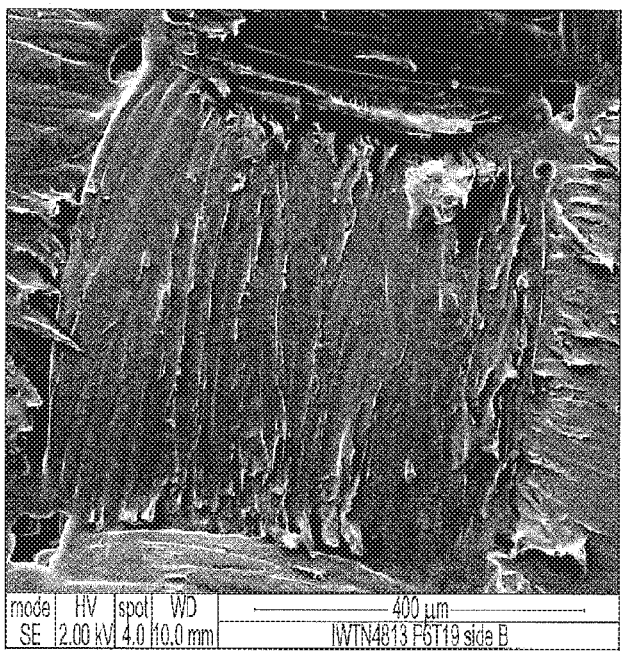
Figure 7C:
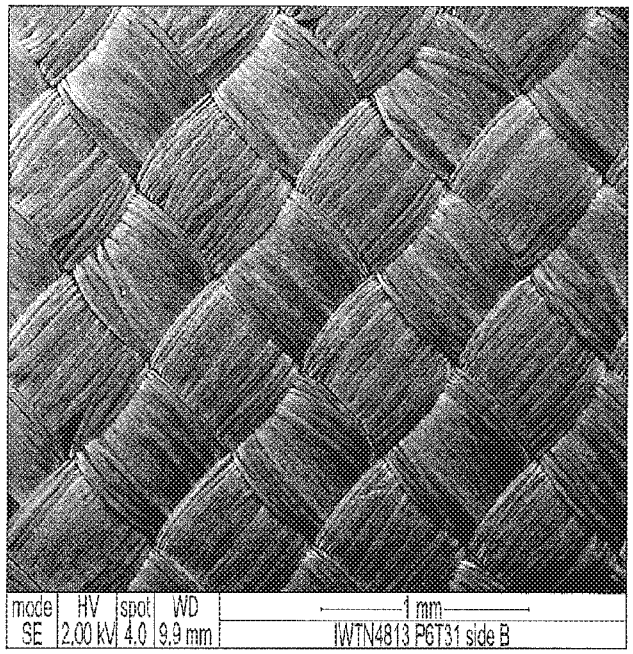
Figure 7D:
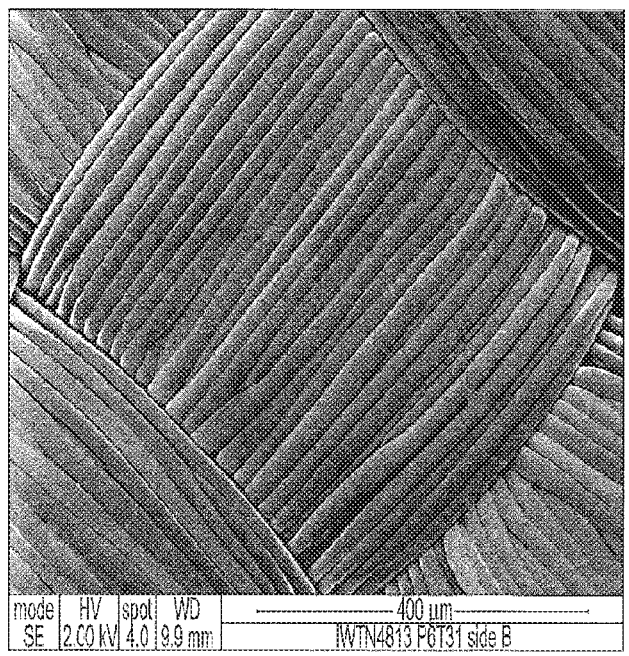

FIGS. 7A and 7B are SEM images which show the surface structure at 2 different magnifications of the fabrics described in Example 5 after non-optimized wet calendering. FIGS. 7C and 7D show the surface structure at 2 different magnifications of the fabrics described in Example 5 after optimized wet calendering. For the non-optimized process, the combination high temperature and pressure melts the surface filaments and converts the structure into a partial film, which although having low permeability, has reduced mechanical properties. For the optimized conditions, the use of lower temperature and pressure creates the preferred structure in which the surface fibers have a permanently modified cross-section and fusion of at least a portion of the surface filaments in the fiber. This results in a fabric with permanently low permeability and high tensile strength. Whilst not been bound by any particular theory it is postulated that the use of temperatures greater than the polymer softening point which are necessary to create the desired fabric structure for the dry process, when used with the wet process and owing to the increased heat transfer, tend to fully melt the surface filaments, giving very low permeability but significantly reducing fabric tensile strength. By reducing the heated roll temperature and pressure at the nip, an optimized set of process conditions can be readily found, that give the desired fabric structure leading to the combination of low permeability and high tensile strength.

Example 6

5 fabrics woven from Nylon 6,6 470 decitex, 136 filament and 81 cN/tex tenacity fibers were produced by conventional weaving and finishing routes. The fabric processing details are listed in Table 4. The fabrics were HTHP treated on a calender by wet and by dry processes to produce 2 fabrics in each case. The fabric constructions following HTHP treatment are shown in Table 4. Treatment was on both the top and bottom surface, by passing twice through a calendering machine with heated roll. The process conditions were as follows: for the dry process 57 MPa pressure via a calender nip roll with force 400 N/mm of fabric width, with the heated roll at between 223-225° C., at 5 m/min process speed. For the wet process 43 MPa pressure via a calender nip roll with force 300 N/mm of fabric width, with the heated roll at between 168° C., at 15 m/min process speed. The wet process produces a fabric with a slightly higher construction than the dry process. This is due to marginally more fabric shrinkage occurring on the calender during the wet process.

TABLE 4

| Sample | Loom | Dry Processed | | Water Processed | |
|---|---|---|---|---|---|
| | | ends/dm | picks/dm | ends/dm | picks/dm |
| 1 | Water Jet, scoured | 174 | 177 | 175 | 177 |
| 2 | Air Jet, scoured | 188 | 184 | 190 | 188 |
| 3 | Rapier scoured | 178 | 179 | 181 | 177 |
| 4 | Water Jet, unscoured | 194 | 192 | 195 | 194 |
| 5 | Water Jet, scoured | 197 | 194 | 198 | 199 |

Table 5 shows the physical properties for each of the fabrics following the dry and wet calendering processes. For mechanical properties, in each case 5 samples in the warp direction and 5 samples in the weft direction were tested. Hence, each of the mechanical property results displayed in Table 5 are an arithmetical mean of 10 samples. For permeability, 6 samples were tested for each fabric, hence, each of the permeability results displayed in Table 5 are an arithmetical mean of 6 samples.

TABLE 5

| | Dry Processed Nylon 6, 6 Fabrics | | | | | Water Processed Nylon 6, 6 Fabrics | | | | |
|---|---|---|---|---|---|---|---|---|---|---|
| Sample | 1 | 2 | 3 | 4 | 5 | 1 | 2 | 3 | 4 | 5 |
| Mean Tensile Strength (N/50 mm) | 2618 | 2848 | 2593 | 3069 | 3201 | 2976 | 3115 | 2997 | 3220 | 3292 |
| Normalised Tenacity (N/(end/dm)) | 14.9 | 15.3 | 14.5 | 15.9 | 16.4 | 16.9 | 16.5 | 16.7 | 16.6 | 16.6 |
| Extension to Break (%) | 28.9 | 27.5 | 29.7 | 31.2 | 33.9 | 34.5 | 32.8 | 35.7 | 35.2 | 37.2 |
| Work to Break (Tenacity × √ Ext to Break) | 80 | 80 | 79 | 89 | 95 | 99 | 95 | 100 | 98 | 101 |
| Tear Strength (N) | 143 | 161 | 168 | 176 | 152 | 152 | 173 | 182 | 187 | 159 |
| Edgecomb Resistance Strength (N) | 500 | 334 | 225 | 399 | 578 | 565 | 330 | 303 | 476 | 648 |
| Static Air Permeability (l/dm²/min) | 0.79 | 0.61 | 0.60 | 0.14 | 0.21 | 0.55 | 0.49 | 0.88 | 0.18 | 0.25 |
| Dynamic Air Permeability (mm/s) | 325 | 270 | 298 | 100 | 155 | 241 | 243 | 422 | 107 | 124 |

When comparing the mechanical properties relating to various aspects of fabric strength the wet process results in higher values than the dry process. This comparison takes into account the marginally higher construction of the wet process fabrics by normalizing the fabric breaking strength by the fabric construction to produce a fabric tenacity.

The permeabilities of the fabrics as measured by SAP and DAP are equivalent, but the wet processed fabric have been produced at 3x the processing speed of the dry processed fabrics.

FIGS. 8 to 14 are box plots which display and compare the arithmetical mean of each fabric physical property for the 5 fabrics processed both wet and dry.

Figure 8:
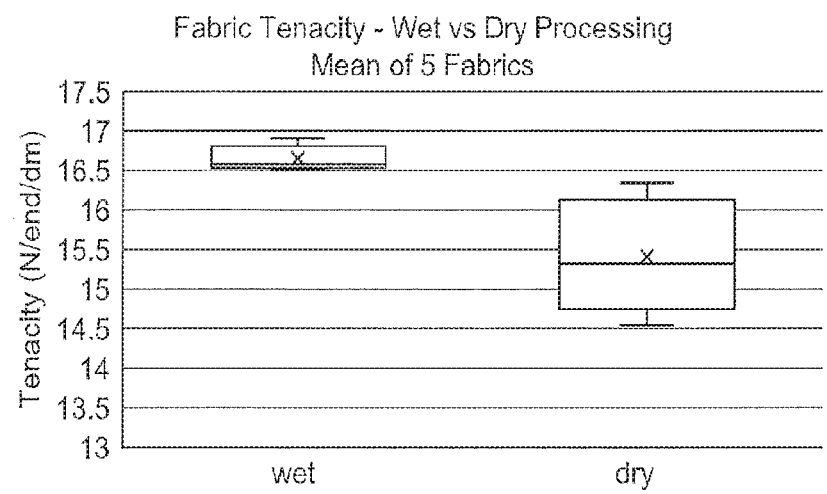
FIG. 8 is a box plot graph comparing the mean fabric tenacity of a range of Nylon 6,6 fabrics after dry and wet calendering as described in Example 6.

FIG. 8 plots the mean value of the 5 fabrics for fabric tenacity—this takes into account the marginally higher construction of the wet processed fabrics. The tenacity of the same fabrics processed wet is higher than that processed dry.

Figure 9:
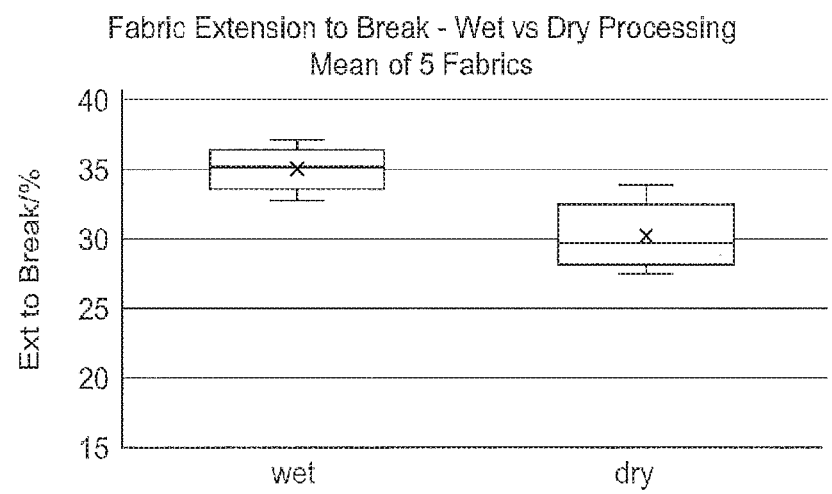
FIG. 9 is a box plot graph comparing the mean fabric extension to break of a range of Nylon 6,6 fabrics after dry and wet calendering as described in Example 6.

FIG. 9 plots the mean value of the 5 fabrics for fabric extension to break. The extension to break of the same fabrics processed wet is higher than that processed dry.

Figure 10:
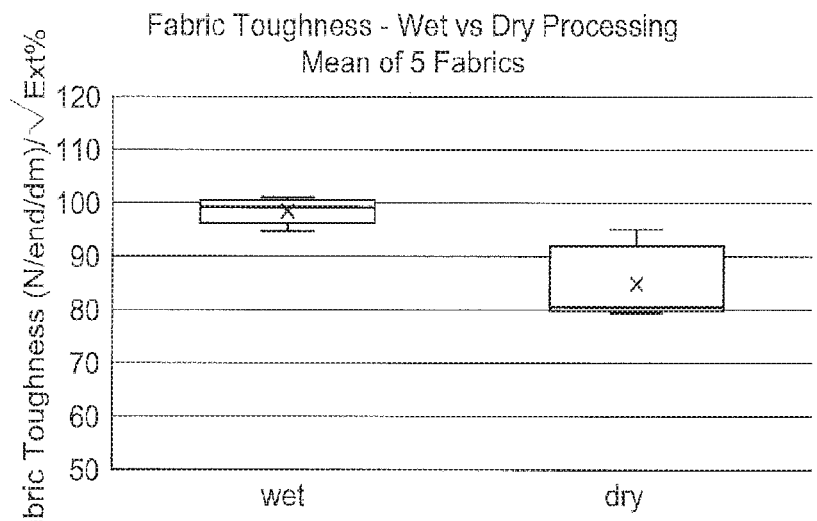
FIG. 10 is a box plot graph comparing the mean fabric toughness, or work to break, of a range of Nylon 6,6 fabrics after dry and wet calendering as described in Example 6.

FIG. 10 plots the mean value of the 5 fabrics for fabric toughness—the fabric toughness, or work to break, is approximated as the (Tenacity×√tension to Break). The fabric toughness of the same fabrics processed wet is higher than that processed dry. This implies that wet processed fabrics would be more resilient or robust than dry processed fabrics during a typical airbag deployment.

Figure 11:
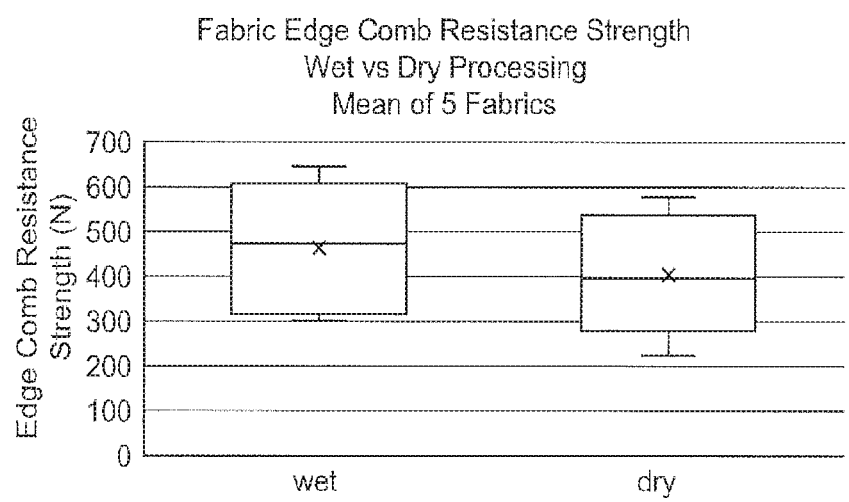
FIG. 11 is a box plot graph comparing the mean fabric edgecomb resistance strength of a range of Nylon 6,6 fabrics after dry and wet calendering as described in Example 6.

FIG. 11 plots the mean value of the 5 fabrics for fabric edgecomb resistance strength. The edgecomb resistance strength of the same fabrics processed wet is higher than that processed dry. This implies that the seam strength of an airbag produced from wet processed fabric will be improved over the dry processed equivalent fabric. Note dry calendering already results in a significant increase in edge comb resistance compared to the equivalent non calendered control fabric, wet calendering results in a further improvement.

Figure 12:
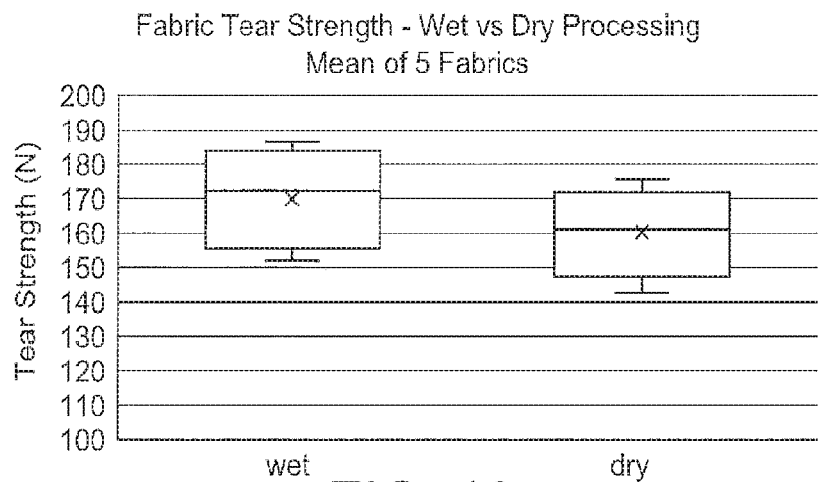
FIG. 12 is a box plot graph comparing the mean fabric tear strength of a range of Nylon 6,6 fabrics after dry and wet calendering as described in Example 6.

FIG. 12 plots the mean value of the 5 fabrics for fabric tear strength. The tear strength of the same fabrics processed wet is higher than that processed dry. This implies that an airbag produced from wet processed fabric will be more resistant to tearing during deployment than a dry processed fabric.

Figure 13:
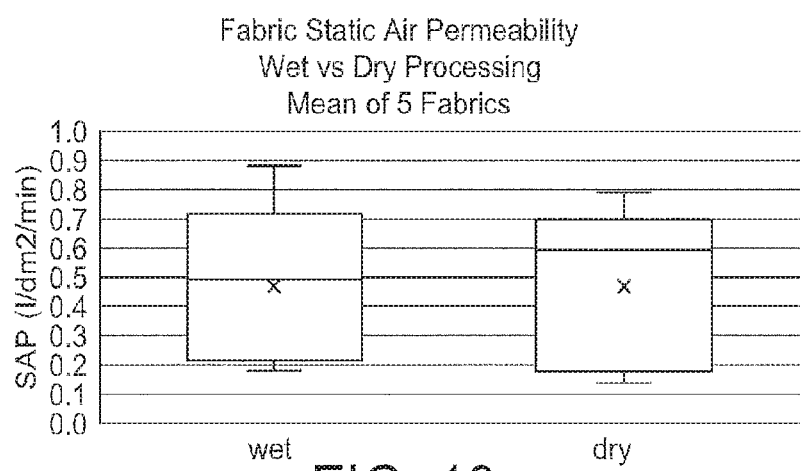
FIG. 13 is a box plot graph comparing the mean fabric static air permeability of a range of Nylon 6,6 fabrics after dry and wet calendering as described in Example 6.
Figure 14:
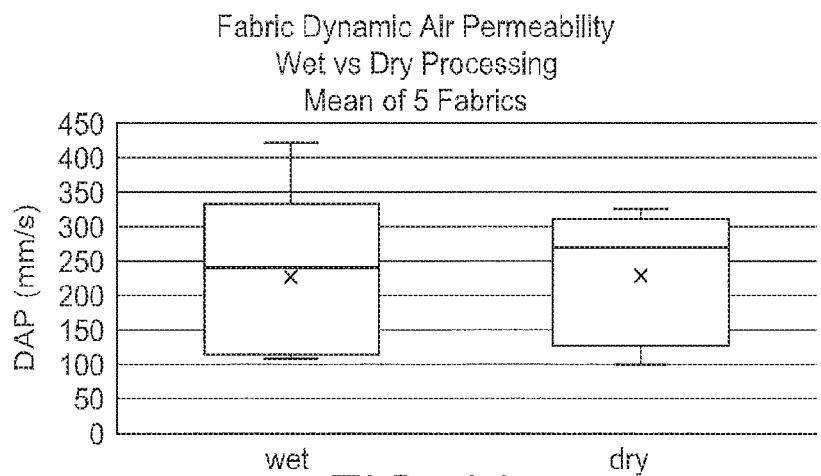
FIG. 14 is a box plot graph comparing the mean fabric dynamic air permeability of a range of Nylon 6,6 fabrics after dry and wet calendering as described in Example 6.

FIGS. 13 and 14 plot the mean values of fabric permeability (SAP and DAP). The permeability of the fabrics produced by the wet and dry process is equivalent—yet the wet processed fabrics were produced at 3x the calender processing speed.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also the individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±8%, or ±10%, of the numerical value(s) being modified. In addition, the phrase "about 'x' to 'y'" includes "about 'x' to about 'y'". While the illustrative embodiments of the invention have been described with particularity, it will be understood that the invention is capable of other and different embodiments and that various other modifications will be apparent to and may be readily made by those skilled in the art without departing from the spirit and scope of the invention. Accordingly, it is not intended that the scope of the claims hereof be limited to the examples and descriptions set forth herein but rather that the claims be construed as encompassing all the features of patentable novelty which reside in the present disclosure, including all features which would be treated as equivalents thereof by those skilled in the art to which the invention pertains.

What is claimed is:

1. A method for producing a woven fabric, said method comprising:
   (a) weaving fibers in a warp direction and a weft direction to form a fabric having a top surface and a bottom surface, wherein the warp fibers and weft fibers each comprises one or more filaments of a synthetic polymer having substantially uniform cross-sectional composition;

(b) fusing together at least a portion of the filaments in the fibers on the top surface of the fabric or at least a portion of the filaments in the fibers on the bottom surface of the fabric, wherein said filaments are fused together in the presence of a heat transfer liquid or vapor added prior to fusing and retained by the filaments, wherein the amount of heat transfer liquid or vapor added prior to fusing is in the range from about 5 to about 30 wt % based on the weight of the dry fabric and wherein the fusing step produces a treated fabric having a tensile strength in both the warp and weft directions of 1000 N/50 mm or greater and having, in the absence of any coating, a static air permeability (SAP) of 3 l/dm$^2$/min or lower.

2. The method of claim 1, wherein the fusing is performed by treating the woven fabric at a temperature and/or pressure sufficient to permanently modify a cross-sectional dimension and fuse at least a portion of the filaments in the fibers on the top surface of the fabric or at least a portion of the filaments in the fibers on the bottom surface of the fabric.

3. The method of claim 2, wherein the temperature in step (b) is decreased as compared to a temperature required to permanently modify the cross-sectional dimension and fuse at least a portion of the filaments in the absence of a heat transfer liquid or vapor.

4. The method of claim 2, wherein the temperature in step (b) is below the dry softening point of the synthetic polymer filaments.

5. The method of claim 2, wherein the pressure in step (b) is decreased as compared to a pressure required to permanently modify the cross-sectional dimension and fuse at least a portion of the filaments in the absence of a heat transfer liquid or vapor.

6. The method of claim 2, wherein the permanently modified cross-section results in at least a portion of the filaments having an aspect ratio from about 1.2:1 to about 10:1.

7. The method of claim 2, wherein the fusing comprises hot roll calendering the woven fabric.

8. The method of claim 7 wherein the hot roll calendering is performed at a fabric speed from about 5 to about 80 m/minute.

9. The method of claim 1, wherein the treated fabric has a root mean square surface (RMS) surface roughness in the range from about 2 to about 70 μm.

10. The method of claim 1, wherein the treated fabric exhibits an edgecomb resistance in both the warp and weft directions of 150 N or greater when the fabric is unaged.

11. The method of claim 1, wherein the heat transfer liquid or vapor comprises water.

12. The method of claim 1 and further comprising applying a coating to the treated fabric to further reduce the static air permeability (SAP) thereof.

13. The method of claim 1, wherein heat transfer liquid or vapor is added to said filaments during the fusing step.

* * * * *